United States Patent
Goto et al.

(10) Patent No.: US 8,642,711 B2
(45) Date of Patent: Feb. 4, 2014

(54) LIVING RADICAL POLYMERIZATION METHOD

(75) Inventors: Atsushi Goto, Uji (JP); Yoshinobu Tsujii, Uji (JP); Kenichi Nakamura, Nagoya (JP); Michihiro Kawai, Nagoya (JP)

(73) Assignee: Kyoto University, Kyoto-shi, Kyoto (JP)

( * ) Notice: Subject to any disclaimer, the term of this patent is extended or adjusted under 35 U.S.C. 154(b) by 0 days.

(21) Appl. No.: 13/824,220

(22) PCT Filed: Sep. 14, 2011

(86) PCT No.: PCT/JP2011/005180
§ 371 (c)(1),
(2), (4) Date: Jun. 24, 2013

(87) PCT Pub. No.: WO2012/035769
PCT Pub. Date: Mar. 22, 2012

(65) Prior Publication Data
US 2013/0267671 A1    Oct. 10, 2013

(30) Foreign Application Priority Data

Sep. 17, 2010   (JP) ................. 2010-210156

(51) Int. Cl.
*C08F 118/02* (2006.01)
(52) U.S. Cl.
USPC ............ 526/135; 526/901; 526/913; 526/346
(58) Field of Classification Search
USPC .................... 526/135, 901, 913, 346
See application file for complete search history.

(56) References Cited

U.S. PATENT DOCUMENTS

| | | | |
|---|---|---|---|
| 6,620,885 B2 * | 9/2003 | Guo et al. ...................... | 525/132 |
| 6,716,935 B1 | 4/2004 | Nelson et al. | |
| 2002/0103320 A1 * | 8/2002 | Melchiors et al. ............. | 526/319 |
| 2003/0035756 A1 | 2/2003 | Nelson et al. | |
| 2010/0240827 A1 * | 9/2010 | Barwick et al. ............... | 524/577 |

FOREIGN PATENT DOCUMENTS

| JP | 2004-535274 A | 11/2004 |
|---|---|---|
| JP | 2006-511657 A | 4/2006 |
| JP | 2007-177217 A | 7/2007 |
| JP | 2010-084106 A | 4/2010 |

* cited by examiner

*Primary Examiner* — Robert D. Harlan
(74) *Attorney, Agent, or Firm* — Seed IP Law Group PLLC

(57) ABSTRACT

Provided is a low-cost, highly active, environmentally friendly living radical polymerization method which does not require a radical initiator. Even if a catalyst is not used, a living radical polymerization method can be conducted by controlling the amount of the oxygen in the gaseous phase in the reaction vessel within a suitable range. A monomer having a radical-reactive unsaturated bond can be subjected to a radical polymerization reaction to obtain a polymer having narrow molecular weight distribution. The cost of the living radical polymerization can be remarkably reduced. The present invention eliminates the disadvantages of the conventional catalysts such as toxicity, low solubility, coloring/odor and the like, and is significantly more environmentally friendly and economically efficient than conventional living radical polymerization methods.

10 Claims, No Drawings

LIVING RADICAL POLYMERIZATION METHOD

TECHNICAL FIELD

The present invention is directed to a living radical polymerization method.

BACKGROUND ART

A radical polymerization method has been a well-known method for polymerizing vinyl monomers to obtain a vinyl polymer. Generally, a radical polymerization method has the disadvantage of the difficulty in controlling the molecular weight of the obtained vinyl polymer. Further, there is the disadvantage that the obtained vinyl polymer is a mixture of compounds having various molecular weights, and thus it is difficult to obtain a vinyl polymer having narrow molecular weight distribution. Specifically, even if the reaction is controlled, the ratio of weight-average molecular weight ($M_w$) and number-average molecular weight ($M_n$), ($M_w/M_n$), can be only reduced to about 2 to 3.

As a method for eliminating the aforementioned disadvantages, since around 1990, a living radical polymerization method has been developed. Specifically, according to the living radical polymerization method, it is possible to control the molecular weight. It is also possible to obtain a polymer having narrow molecular weight distribution. Specifically, a polymer having $M_w/M_n$ of 2 or less can easily be obtained. Therefore, this method has come into the limelight as a method for producing a polymer used in an advanced technology such as nanotechnology.

Oxygen is known as a material which inhibits a radical reaction (polymerization inhibitor) in a radical polymerization method. Therefore, in general, a reaction is carried out in an atmosphere in which there is no oxygen. Also in a living radical polymerization, in general, a polymerization reaction has been carried out while the atmosphere in the reaction vessel is replaced with an inert gas such as nitrogen gas or argon. That is, in order to carry out a living radical polymerization reaction, it has been believed that it is preferred to eliminate the oxygen in the atmosphere as much as possible. Those skilled in the art did not believe that it is possible to use oxygen positively in a living radical polymerization. Further, it could not be expected at all by those skilled in the art that a living radical polymerization can be controlled by controlling the concentration or amount of the oxygen.

Furthermore, it was conventionally believed that it is necessary to add a compound which can control the progression of a polymerization reaction as a catalyst into a reaction solution in order to control a living radical polymerization. Therefore, it was conventionally practiced to control a living radical polymerization by adding a compound which acts as a catalyst into a reaction solution. That is, in a conventional and general living radical polymerization method, a method is performed in which a polymerization is controlled by adding a catalyst into the reaction solution in an inert gas atmosphere.

Catalysts which are currently used in living radical polymerization methods include transition metal complex-type catalysts.

For transition metal complex-type catalysts, complexes in which a ligand is coordinated to a compound having a central metal of Cu, Ni, Re, Rh, Ru, or the like have been used. Such catalysts are described in the following documents for example.

Patent Document 1 (Japanese Laid-open Publication No. 2002-249505) discloses that a complex in which Cu, Ru, Fe, Ni or the like is a central metal, is used as a catalyst.

Patent Document 2 (Japanese Laid-open Publication No. 11-322822) discloses that a hydrido rhenium complex is used as a catalyst.

Non-Patent Document 1 (Journal of The American Chemical Society 119, 674-680 (1997)) discloses that a compound in which 4,4'-di-(5-nonyl)-2,2'-bipyridine is coordinated with copper bromide, is used as a catalyst.

However, when such a transition metal complex catalyst is used, it is necessary to use a large amount of the catalyst. This is disadvantageous as it is not easy to completely remove the large amount of the catalyst used, from the products after the reaction. Another disadvantage is environmental problems which may occur by the disposal of the catalyst. The transition metal for the living radical polymerization method includes many toxic metals. The disposal of a large amount of such toxic metals causes environmental problems. Furthermore, there are cases where toxicities of catalysts remaining in products cause environmental problems. Due to the toxicity, it is difficult to use the transition metal catalysts for the production of food packages, material for living body, and medical material. Additionally, there is a problem associated with a high electroconductivity of the transition metal remaining in polymer, rendering the polymer conductive and hence unsuitable for use in electronic material such as resist material, organic electrochemical luminescence material, fuel cell, solar cell, lithium-ion cell. Furthermore, the transition metal-type catalysts do not dissolve in a reaction solution unless they form a complex. Therefore, it is necessary to use a ligand as an additive to form a complex. This causes problems, i.e., an increase of the cost of production and also an increase of the total weight of the catalyst used. Further, a ligand is usually expensive and requires a complicated synthesis method. Furthermore, the polymerization reaction requires a high temperature (for example, 110° C. or higher). (For example, in aforementioned Non-patent document 1, the polymerization reaction is performed at 110° C.).

It is noted that a living radical polymerization methods, which do not require a catalyst, have also been known. For example, a nitroxyl-type method and dithioester-type method have been known. However, these methods have the following disadvantages. A special protecting group must be introduced to the polymer growing chain. The protecting group is very expensive. Further, the polymerization reaction requires a high temperature (for example, 110° C. or higher). Further, the produced polymer is likely to have undesirable properties. For example, the produced polymer is likely to be colored differently from the natural color of the polymer. Further, the produced polymer is likely to have an odor.

On the other hand, Non-Patent Document 2 (Polymer Preprints 2005, 46(2), 245-246) and Patent Document 3 (Japanese Laid-open Patent Publication No. 2007-92014) disclose that compounds having Ge, Sn or the like as a central metal are used as catalysts. Patent Document 4 (International Publication WO2008/139980) discloses that compounds having nitrogen or phosphorus as a central metal are used as catalysts. Non-Patent Document 3 (*Polymer Preprints* 2007, 56(2), 2452, The Society of Polymer Science, Japan, 56th Symposium on Macromolecules) discloses that a compound having a central metal of phosphorous is used as a catalyst.

In regard to the copper complex catalyst described in Non-Patent Document 1, the cost for the catalyst required to polymerize 1 kg of a polymer sums up to approximately several thousand yen. On the other hand, in regard to a germanium catalyst, the cost is cut down to about one thousand yen. Thus, the inventions of Non-Patent Document 2 and Patent Document 3 markedly decrease the cost for the catalyst. However, in order to apply living radical polymerization to general-purpose resin products and the like, a further less expensiveness is demanded. The inventions of Non-Patent Document 3 and Patent Document 4 further decreased the cost for a catalyst.

However, there is no description in Patent Documents 1 to 4 and Non-Patent Documents 1 to 3 regarding a method for obtaining a polymer having narrow molecular weight distribution by controlling the living radical polymerization without using a catalyst.

As such, in the prior art, it was believed that when an inexpensive and general-purpose protecting group such as halogen is used, it is absolutely necessary to add some compound, which act as a catalyst for reversibly producing a radical from a dormant species, into a reaction solution. The reason for it is as follows. It was believed that since the fundamental principle of a living radical polymerization is to reversibly produce a radical from a dormant species, it is a natural prerequisite to add a compound which reversibly controls the production of a radical from a dormant species into the reaction solution for controlling the reaction. That is, it was a common technical knowledge that it is impossible to perform a living radical polymerization without adding a catalyst when an inexpensive and general-purpose protecting group such as halogen is used. The aforementioned Patent Documents 1 to 4 and Non-Patent Documents 1 to 3 are all described based on such a common technical knowledge.

PRIOR ART REFERENCES

Patent Document

[Patent Document 1] Japanese Laid-open Patent Publication No. 2002-249505
[Patent Document 2] Japanese Laid-open Patent Publication No. 11-322822
[Patent Document 3] Japanese Laid-open Patent Publication No. 2007-92014
[Patent Document 4] International Publication WO2008/139980

Non-Patent Document

[Non-Patent Document 1] *Journal of the American Chemical Society* 119, 674-680 (1997)
[Non-Patent Document 2] *Polymer Preprints* 2005, 46(2), 245-246, "Germanium- and Tin-Catalyzed Living Radical Polymerizations of Styrene", American Chemical Society, Division of Polymer Chemistry
[Non-Patent Document 3] *Polymer Preprints* 2007, 56(2), 2452, "A Novel Living Radical Polymerization using Germanium and Phosphorus Compound," The Society of Polymer Science, Japan, 56th Symposium on Macromolecules

SUMMARY OF THE INVENTION

Problems to be Solved by the Invention

The present invention aims to solve the aforementioned problems. The main objective of the present invention is to provide a living radical polymerization method without necessity to add a catalyst.

Means for Solving the Problems

The present inventors earnestly conducted research to solve the above-mentioned problems and, as a result, it was found that in a living radical polymerization method, a polymer having very narrow molecular weight distribution is obtained by setting the amount of the oxygen in the reaction vessel within a certain range during a polymerization step of monomers, without using a catalyst such as above-mentioned transition metal complex or a special protecting group. The present invention has been accomplished based on such findings and additional investigation. That is, according to the present invention, the following polymerization methods and methods for producing polymers are provided, and thereby the aforementioned problems are solved.

(1) A living radical polymerization method, comprising:
performing polymerization by charging a reaction solution containing a radical-reactive monomer, a radical initiator, and an organic halide having a carbon-halogen bond into a reaction vessel;
wherein the amount of oxygen in the gaseous phase within the reaction vessel during the polymerization step is 1 to 70 millimoles relative to 1 L of the volume of the liquid phase in the reaction vessel.

(2) The method according to above item 1, wherein the amount of oxygen in the gaseous phase within the reaction vessel during the polymerization step is 1.5 to 30 millimoles relative to 1 L of the volume of the liquid phase in the reaction vessel.

(3) The method according to above item 1 or 2, wherein no compound other than gaseous oxygen is added as a catalyst for reversibly producing a radical from the dormant species or as a compound for generating a catalyst for reversibly producing a radical from the dormant species in the reaction solution during the polymerization.

(4) The method according to any one of above items 1 to 3, wherein the oxygen concentration in the gaseous phase in the vessel is 1% by volume to 10% by volume.

(5) The method according to any one of above items 1 to 3, wherein the gaseous phase in the vessel is the air.

(6) The method according to any one of above item 1 to 5, wherein two methyl groups are bound to a carbon atom to which a halogen is bound in the organic halide, or one methyl group and one hydrogen are bound to a carbon atom to which a halogen is bound in the organic halide.

(7) The method according to any one of above item 1 to 6, wherein the halogen in the organic halide is iodine.

(8) The method according to any one of above item 1 to 7, wherein the radical-reactive monomer is acrylic acid, acrylate, methacrylic acid, methacrylate, or styrene.

(9) The method according to any one of above item 1 to 8, wherein
no solvent is used in the reaction solution, or the amount of the solvent used is 120 parts by weight or less relative to 100 parts by weight of the monomer,
the concentration of the radical initiator is 5 to 150 mM, and
the concentration of the organic halide is 10 to 100 mM.

(10) A method for producing a polymer, comprising:
performing polymerization by charging a reaction solution containing a radical-reactive monomer, a radical initiator, and an organic halide having a carbon-halogen bond into a reaction vessel;
wherein the amount of oxygen in the gaseous phase within the reaction vessel during the polymerization step is 1 to 70 millimoles relative to 1 L of the volume of the liquid phase in the reaction vessel.

It is noted that in a preferred embodiment, the organic halide having a carbon-halogen bond is a compound having the following general formula (II):

$$CR^2R^3R^4X^3 \qquad (II)$$

wherein $R^2$ and $R^3$ are each, independently, halogen, hydrogen, or alkyl; $R^4$ is halogen, hydrogen, alkyl, aryl, heteroaryl, or cyano; $X^3$ is halogen; and the monomer having a radical-reactive unsaturated bond is selected from:

(meth)acrylic acid ester monomers; aromatic unsaturated monomers (styrene-type monomers); carbonyl-group-containing unsaturated monomers; (meth)acrylonitriles; (meth)acrylamide-type monomers; diene-type monomers; vinyl ester monomers; N-vinyl monomers; (meth)acrylic acid monomer; vinyl halide monomers; and 1-olefin monomers.

As described above, the present invention is based on a concept which is quite different from the conventionally known living radical polymerization method, in which, in carrying out a living radical polymerization method, the polymerization reaction is controlled by controlling the amount of the oxygen provided in the reaction solution (typically, the amount (concentration or volume) of the oxygen in the reaction vessel) within a certain range.

Effect of the Invention

According to the present invention, a living radical polymerization method with a high controllability is provided. That is, in the present invention, the oxygen concentration in the reaction vessel is set within a certain range and thereby in the polymerization step of monomers, it is not necessary to use a catalyst such as a transition metal complex, and it is made possible to eliminate disadvantages due to the use of a catalyst. For example, disadvantages such as toxicity of a catalyst compound which is used in the polymer production step or included in a produced polymer, and low solubility of a catalyst compound in a reaction solution can be eliminated. Since the polymerization method of the present invention has high reactivity, a high temperature (for example, 110° C. or higher) is not required in the polymerization reaction. Furthermore, the polymerization reaction does not require an expensive unique protecting group for protecting a polymer growing chain during a reaction. Additionally, molded products, which are obtained from the polymer obtained by the method of the present invention, have the advantage in which color or odor does not substantially occur during the molding process.

As described above, conventionally, those skilled in the art believed that in order to control a living radical polymerization, it is necessary to add a compound which acts as a catalyst into the reaction solution, and therefore, the effect of the present invention that a living radical polymerization is made possible without using a catalyst or a special protecting group, only by controlling the oxygen amount provided in the reaction solution in a certain range without adding a compound which acts as a catalyst, is surprising such that those skilled in the art could not expected at all from the common technical knowledge.

Moreover, the present invention has the following advantages.

(1) Economical Efficiency

Since there is no need to use a catalyst, the cost of material is dramatically decreased as compared to the prior art. In addition, since a catalyst is not used, the cost required for removing a catalyst from the produced polymer, which was very extensive in the prior art, is not needed at all, and therefore, the production process is significantly inexpensive.

(2) Safety to the Human Body and Environment

Since a harmful catalyst is not used, the present invention is significantly superior in safety to the human body and environment.

(3) Versatility of Usable Monomers

A variety type of monomers having radical polymerizability can be used as a polymer raw material in the present invention. Especially, when a monomer having a highly-reactive functional group (such as a hydroxyl group) in the molecule is used, the method of the present invention is hardly affected by the functional group of the monomer, and thus is advantageous. Similarly, it is advantageous when using a solvent having a highly-reactive functional group.

(4) Applications for Material for Living Body, Medical Material, and Electronical Material Since no harmful catalyst is used, there is no problem of catalyst residue in the application for living body/medical material, and the field of living body/medical material can be a unique application field. Further, since no electroconductive catalyst is used, there is no problem of catalyst residue in the application for electronical material, and the field of electronical material can be a unique application field.

As described above, according to the present invention, a living radical polymerization method, which is significantly more environment-friendly and economically advantageous than conventional methods, and can meet a variety of uses, has been realized.

Further, according to the present invention, a polymer having very narrow molecular weight distribution is obtained. That is, the polymer obtained by the method of the present invention has the advantages compared with a polymer obtained by the conventional living radical polymerization method. The polymer having narrow molecular weight distribution obtained by the method of the present invention is useful as a material for a variety of use including the most advanced field such as nanotechnology.

EMBODIMENTS FOR CARRYING OUT THE INVENTION

Hereinbelow, the present invention will be explained in detail.

(General Terms)

Hereinafter, the terms, which are particularly used in the present specification, will be explained.

In the present specification, a "hydrocarbon" refers to a molecule or group which consists of carbon and hydrogen. A chain hydrocarbon may be a straight chain or branched chain. A cyclic hydrocarbon may consist of a cyclic structure. A cyclic hydrocarbon may have a structure in which a chain hydrocarbon is linked to the cyclic structure. A hydrocarbon may have an arbitrary natural number of carbon atoms. Preferably, a hydrocarbon has 1 to 30 carbon atoms. More preferably, a hydrocarbon has 1 to 20 carbon atoms. Further preferably, a hydrocarbon has 1 to 10 carbon atoms.

When a hydrocarbon molecule or hydrocarbon group is unsaturated, the unsaturated bond may be a double bond or triple bond. The hydrocarbon molecule or hydrocarbon group may have only one unsaturated group, or may have two or more unsaturated groups.

Specific examples of the hydrocarbon include alkyl, alkenyl, alkynyl, aryl, and the like.

In the present specification, an "alkyl" refers to a monovalent group which is generated after a chain or cyclic aliphatic hydrocarbon (alkane) loses a hydrogen atom. In the cases of a chain alkyl group, the alkyl group is generally represented by $C_kH_{2k+1}$—(wherein k is a positive integer). A chain alkyl group may be a straight chain or branched chain. A cyclic alkyl group may consist of a cyclic structure. A cyclic alkyl group may have a structure in which a chain alkyl group is linked to the cyclic structure. An alkyl group may have an arbitrary natural number of carbon atoms. Preferably, an alkyl group has 1 to 30 carbon atoms. More preferably, an alkyl group has 1 to 20 carbon atoms. In the present specification, an "alkylene" refers to a divalent group which is generated after an alkyl group further loses one hydrogen atom.

In the present specification, a "lower alkyl" refers to an alkyl group having a relatively small number of carbon atoms. Preferably, a lower alkyl is a $C_{1-10}$ alkyl group. More preferably, a lower alkyl is a $C_{1-5}$ alkyl group. Further preferably, a lower alkyl is a $C_{1-3}$ alkyl group. For instance, specific examples include methyl, ethyl, propyl and isopropyl. In the present specification, a "lower alkylene" refers to a divalent group which is generated after a lower alkyl group further loses one hydrogen atom.

In the present specification, a "substituted alkyl" refers to a group in which a hydrogen atom of an alkyl group is substituted with a substituent. Such a substituent includes aryl, heteroaryl, cyano and the like.

In the present specification, a "halogenated substituted alkyl" refers to a group in which a hydrogen of an alkyl group is substituted with a halogen, and another hydrogen of the alkyl group is substituted with another substituent. For, example, such another substituent includes an aryl group, a heteroaryl group, a cyano group and the like.

In the present specification, an "aryl" refers to a group which is generated after a hydrogen atom bound to a ring of an aromatic hydrocarbon is removed. The number of aromatic hydrocarbon ring constituting aryl may be one, alternatively, may be two or more. Preferred number of aromatic hydrocarbon ring is one to three. When there are a plurality of aromatic hydrocarbon rings in a molecule, the plurality of rings may be fused or not. Specifically, for example, an aryl includes a phenyl group, naphthyl group, anthracenyl group, biphenyl group, and the like.

In the present specification, a "heteroaryl" refers to a group in which elements constituting the ring skeleton of an aromatic ring of aryl contain a heteroatom other than carbon. Examples of heteroatoms include, specifically, oxygen, nitrogen, sulfur, and the like. The number of heteroatom in the aromatic ring is not particularly limited. The aromatic ring may contain, for example, only one heteroatom, or may contain two, three, or four or more heteroatoms.

In the present specification, a "substituted aryl" refers to a group which is generated after a substituent binds to an aryl group. In the present specification, a "substituted heteroaryl" refers to a group which is generated after a substituent binds to a heteroaryl group.

In the present specification, a "halogen" refers to a monovalent radical of an element, which belongs to the 7B group of the periodic table, such as a fluorine (F), chlorine (Cl), bromine (Br) and iodine (I). Preferred is bromine or iodine, and more preferred is iodine.

In the present specification, an "alkoxy" refers to a group in which an oxygen atom is bound to the aforementioned alkyl group. That is, when the alkyl group is represented by R—, the alkoxy refers to a group represented by RO—. A chain alkoxy group may be a straight chain or branched chain. Cyclic alkoxy may be composed only of a cyclic structure, or may have a structure formed from a cyclic structure further linked with chain alkyl. The number of carbon atoms in the alkoxy may be any natural number. The number of carbon atoms is preferably from 1 to 30, and more preferably from 1 to 20. The number of carbon atoms is further preferably from 1 to 10, still further preferably from 1 to 5, and especially preferably from 1 to 3. Specific examples thereof include methoxy, ethoxy, propoxy, isopropoxy, and the like.

In the present specification, an "amine" refers to a compound in which three organic groups are bound to a nitrogen. The organic groups are preferably an alkyl.

In the present specification, a "living radical polymerization" refers to a polymerization reaction in which a chain transfer reaction does not substantially occur in a radical polymerization reaction and a termination reaction does not substantially occur in the radical polymerization reaction, and the growing chain end maintains the activity even after the monomers have exhaustively reacted. According to this polymerization reaction, after completion of a polymerization reaction, a terminal of the generated polymer maintains the polymerization activity. If a monomer is added, then it is possible to start the polymerization reaction again.

A living radical polymerization is characterized in that, for example, a polymer having an arbitrary average molecular weight can be synthesized by adjusting the ratio of concentrations of a monomer and polymerization initiator, and the generated polymer has very narrow molecular weight distribution, and can be applied to a block copolymer. It is noted that a living radical polymerization is sometimes abbreviated as "LRP".

Hereinafter, the present invention will be explained in detail.

(Catalyst)

In the present specification, a catalyst refers to that which is used for reversibly producing a radical from a dormant species in a living radical polymerization method.

The oxygen existing as gaseous molecules is not included in the catalyst in the present specification.

In a preferred embodiment of the present invention, the conventional catalyst for reversibly producing a radical from a dormant species is not used.

The polymerization method of the present invention is based on the mechanism in which the oxygen existing as gaseous molecules is introduced into a reaction solution and thereby the living radical polymerization is controlled. In a preferred embodiment, the polymerization reaction is carried out only based on the mechanism in which the oxygen existing as gaseous molecules are introduced into the reaction solution and thereby the living radical polymerization is controlled. In one embodiment, a compound other than that comprised of halogen and oxygen is not used as a catalyst.

However, in the present invention, a known catalyst can be optionally used as a catalyst for a living radical polymerization method. The catalyst abstracts a halogen from a dormant species to produce a radical during a living radical polymerization. Therefore, the catalyst removes a group in a compound used as a dormant species which suppresses the growing reaction to covert into an active species, and controls the growing reaction.

Specifically, a known catalyst such as, for example, the complexes having Cu, Ru, Fe, Ni or the like as a central metal described in Patent Document 1, the copper complex catalyst described in Non-Patent Document 1, the compounds having Ge, Sn or the like as a central metal described in Non-Patent Document 2 and Patent Document 3, the phosphorous compound described in Non-Patent Document 3, the compound having nitrogen or phosphorous as a central metal described in Patent Document 4 can be used. Also, a catalyst having an oxygen atom as a central metal can be used. In addition, a catalyst having a carbon atom as a central metal can be used.

However, in the present invention, it is possible to carry out a living radical polymerization reaction without adding a catalyst. Therefore, in one preferred embodiment, a living radical polymerization reaction is carried out without adding a catalyst.

Usually, in a living radical polymerization method, a catalyst is used in combination with an organic halide having a carbon-halogen bond used as a low molecular weight dormant species. The catalyst abstracts a halogen from the organic halide to produce a radical during a living radical polymerization. In the present invention, it is not needed to add such a catalyst compound into a reaction solution.

In the present invention, even if a catalyst compound is not added, an appropriate amount of oxygen is provided from the gaseous phase in the reaction vessel to the reaction solution and thereby remove a group of a compound used as a dormant species which suppresses the growing reaction to convert the compound into an active species and control the growing reaction. The low molecular weight dormant species is not limited to an organic halide.

(Amount of Catalyst Used)

In the method of the present invention, preferably, a polymerization reaction is carried out without adding a catalyst. However, a small amount of catalyst can be added as needed.

Specifically, for example, in a preferred embodiment, it is possible that the amount of the catalyst used is 10 millimoles (mM) or less relative to 1 liter of reaction solution. In further preferred embodiments, it is possible that the amount of the catalyst used is 5 millimoles or less relative to 1 liter of reaction solution. It is also possible that the amount of the catalyst used is 2 millimoles or less. Furthermore, it is also possible that the amount of the catalyst used is 1 millimoles or less. It is also possible that the amount of the catalyst used is 0.5 millimoles or less. In particularly preferred embodiments, the amount of the catalyst used is 0.2 millimoles or less. It is also possible that the amount of the catalyst used is 0.1 millimoles or less. It is also possible that the amount of the catalyst used is 0.05 millimoles or less. It is also possible that the amount of the catalyst used is 0.02 millimoles or less. It is also possible that the amount of the catalyst used is 0.01 millimoles or less. On a weight basis, it is possible that the amount of the catalyst used is 1% by weight or less of the reaction solution. In a preferred embodiment, it is possible that the amount of the catalyst used is 0.75% by weight or less. It is also possible that the amount of the catalyst used is 0.70% by weight or less. In a further preferred embodiment, it is possible that the amount of the catalyst used is 0.5% by weight or less. It is also possible that the amount of the catalyst used is 0.2% by weight or less. Furthermore, it is also possible that the amount of the catalyst used is 0.1% by weight or less. It is also possible that the amount of the catalyst used is 0.05% by weight or less. For example, in the case of a phosphorous catalyst, the amount can be 0.75% by weight or less. It is also possible that the amount of the catalyst used is 0.70% by weight or less. In further preferred embodiments, it is possible that the amount of the catalyst used is 0.5% by weight or less. It is also possible that the amount of the catalyst used is 0.2% by weight or less. Furthermore, it is also possible that the amount of the catalyst used is 0.1% by weight or less. It is also possible that the amount of the catalyst used is 0.05% by weight or less. In particularly preferred embodiments, it is possible that the amount of the catalyst used is 0.02% by weight or less. It is also possible that the amount of the catalyst used is 0.01% by weight or less. It is also possible that the amount of the catalyst used is 0.005% by weight or less. It is also possible that the amount of the catalyst used is 0.002% by weight or less. Further, it is also possible that the amount of the catalyst used is 0.001% by weight or less. It is also possible that the amount of the catalyst used is 0.0005% by weight or less. It is also possible that the amount of the catalyst used is 0.0002% by weight or less. Further, it is also possible that the amount of the catalyst used is 0.0001% by weight or less. According to the method of the present invention, a polymerization reaction is controlled in an extremely small amount. Conventional catalysts cannot function as the catalyst in such a small amount. That is, it is possible to carry out the reaction with substantially no catalyst added.

(Protecting Group)

In the method of the present invention, a protecting group which protects a growing chain in the process of a living radical polymerization reaction is used. It is possible that a variety of protecting groups which are known as protecting groups conventionally used in a living radical polymerization are used as such protecting groups. In the present invention, it is preferable to use a halogen as a protecting group. As described above regarding to the prior art, when a special protecting group is used, there are disadvantages such as that the protecting group is very expensive.

(Organic Halide (Low Molecular Weight Dormant Species))

According to the method of the present invention, preferably, an organic halide, which has a carbon-halogen bond, is added to the reaction material. Halogen, which is provided to the growing chain by the organic halide, is used as a protecting group. Such organic halides are relatively inexpensive. Therefore, it is more advantageous than other known compounds which are used as protecting groups in a living radical polymerization. Further, if necessary, low molecular weight dormant species in which a halogen is bound to an element other than carbon can be used.

An organic halide used as a dormant species is a compound having at least one carbon-halogen bond in the molecule which acts as a dormant species. There is no other particular limitation. However, generally, the organic halides preferably have one or two halogen atoms in the molecule.

Here, with regard to an organic halide used as a dormant species, it is preferable that when a carbon radical is generated by elimination of a halogen, the carbon radical is unstable. Thus, regarding an organic halide to be used as a dormant species, the organic halide, in which a carbon atom that would become a carbon radical is bound to three substituents that stabilize the carbon radical when the carbon radical is generated by elimination of a halogen, is not suitable. However, in many cases, the organic halide, in which a carbon atom that would become a carbon radical is bound to one or two substituents that stabilize the carbon radical, exhibits appropriate radical stability, and can be used as dormant species.

The number of hydrogen atoms carried by the carbon to which the halogen atom of the organic halide used as a dormant species is bound (hereinafter referred to as "the 1-position carbon of the organic halide" for convenience), is preferably two or less, and more preferably one or less, and it is even more preferable that the carbon does not have any hydrogen atom. Further, the number of halogen atoms bound to the 1-position carbon of the organic halide is preferably three or less, more preferably two or less, and even more preferably one. Particularly, when the halogen atom bound to the 1-position carbon of the organic halide is chlorine atom, the number of the chlorine atoms is very preferably three or less, more preferably two or less, and particularly preferably one.

It is preferable that one or more carbon atoms are bound to the 1-position carbon of the organic halide used as a dormant species, and it is particularly preferable that two or three carbon atoms are bound thereto.

A halogen atom of an organic halide used as a dormant species is preferably chlorine, bromine, or iodine, and more preferably bromine or iodine. From the viewpoint of making molecular weight distribution narrow, most preferred is iodine. In one embodiment, bromine is also preferably usable. Regarding a bromine compound, generally, it is mentioned as advantages that since it is more stable than an iodine compound, it is easy to store lower molecular weight dormant species, and that there is relatively low necessity to remove terminal halogens from a produced polymer. Moreover, regarding a compound having a plurality of bromine, many of them are commercially available or can be easily synthesized, and various branched polymers including star-type, comb-type, and surface-grafted-type polymers and the like can be easily synthesized. There is also an advantage that a block copolymer can be easily synthesized from a compound having bromine on its terminal.

Further, when a catalyst compound having a halogen atom is used, the halogen atom in the organic halide used as a dormant species may be the same as the halogen atom in the catalyst. The halogen atom in the organic halide used as a dormant species may be different from the halogen atom in the catalyst, since even if the halogen atom in the organic halide and the halogen atom in the catalyst are different, it is possible that the halogen atom in the organic halide and the halogen atom in the catalyst are exchanged. However, if the halogen atom in the organic halide used as a dormant species and the halogen atom in the catalyst are the same, it is easier to exchange the halogen atoms between the organic halide used as a dormant species and the compound of the catalyst. Therefore, preferably, the halogen atom in the organic halide and the halogen atom in the catalyst are the same.

In one embodiment, the organic halide used as a dormant species has the following general formula (II):

$$CR^2R^3R^4X^3 \quad (II)$$

wherein $R^2$ is halogen, hydrogen or alkyl. Preferably, $R^2$ is hydrogen or lower alkyl. More preferably, $R^2$ is hydrogen or methyl.

$R^3$ may be the same as $R^2$, or may be different from $R^2$. $R^3$ is halogen, hydrogen, or alkyl. Preferably, $R^3$ is hydrogen or lower alkyl. More preferably, $R^3$ is hydrogen or methyl.

$R^4$ is halogen, hydrogen, alkyl, aryl, heteroaryl or cyano. Preferably, $R^4$ is aryl, heteroaryl, or cyano. When $R^4$ is halogen, hydrogen, or alkyl, $R^4$ may be the same as $R^2$ or $R^3$, or may be different from $R^2$ or $R^3$.

$X^3$ is halogen. Preferably, $X^3$ is chlorine, bromine, or iodine. More preferably, $X^3$ is bromine, or iodine. Most preferably, $X^3$ is iodine. When there is halogen in $R^2$ to $R^4$, $X^3$ may be the same as the halogen in $R^2$ to $R^4$ or may be different from the halogen in $R^2$ to $R^4$. In one embodiment, $X^3$ may be the same halogen as that contained in the compound of the catalyst. $X^3$ may be different from the halogen contained in the catalyst compound.

The aforementioned $R^2$ to $R^4$ and $X^3$ are selected independently from one another. However, preferably, there is no halogen atom or one halogen atom in $R^2$ to $R^4$ (that is, the organic halide contains one or two halogen atoms in the compound).

In one preferred embodiment, the organic halide used as a dormant species is an alkyl halide or substituted alkyl halide. More preferably, the organic halide used as a dormant species is a substituted alkyl halide. In this regard, preferably, the alkyl is a secondary alkyl. More preferably, the alkyl is a tertiary alkyl.

In the alkyl halide or substituted alkyl halide used as a dormant species, the number of carbon atoms in the alkyl is preferably 2 or 3. Therefore, further preferably, the organic halide used as a dormant species is a substituted ethyl halide or substituted isopropyl halide. The substituent in the substituted alkyl halide used as a dormant species includes, for example, phenyl, cyano, and the like.

Preferable specific examples of the organic halide used as a low molecular weight dormant species include, for example, $CH(CH_3)(Ph)I$ and $C(CH_3)_2(CN)I$, as shown in the following chemical formulas:

[Formula 16]

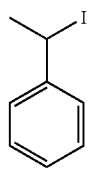
PE-I

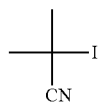
CP-I

Other specific examples of the organic halide used as low molecular weight dormant species include, for example, methyl chloride, methylene chloride, chloroform, chloroethane, dichloroethane, trichloroethane, bromomethyl, dibromomethane, bromoform, bromoethane, dibromoethane, tribromoethane, tetrabromoethane, bromotrichloromethane, dichlorodibromomethane, chlorotribromomethane, iodotrichloromethane, dichlorodiiodomethane, iodotribromomethane, dibromodiiodomethane, bromotriiodomethane, iodoform, diiodomethane, methyl iodide, isopropyl chloride, t-butyl chloride, isopropyl bromide, t-butyl bromide, triiodoethane, ethyl iodide, diiodopropane, isopropyl iodide, t-butyl iodide, bromodichloroethane, chlorodibromoethane, bromochloroethane, iododichloroethane, chlorodiiodoethane, diiodopropane, chloroiodopropane, iododibromoethane, bromoiodopropane, 2-iodo-2-polyethyleneglycosylpropane, 2-iodo-2-amidinopropane, 2-iodo-2-cyanobutane, 2-iodo-2-cyano-4-methylpentane, 2-iodo-2-cyano-4-methyl-4-methoxypentane, 4-iodo-4-cyano-pentanoic acid, methyl 2-iodo-isobutylate, 2-iodo-2-methylpropanamide, 2-iodo-2,4-dimethylpentane, 2-iodo-2-cyanobutanol, 4-methylpentane, cyano-4-methylpentane, 2-iodo-2-methyl-N-(2-hydroxyethyl)propionamide 4-methylpentane, 2-iodo-2-methyl-N-(1,1-bis(hydroxymethyl)-2-hydroxyethyl)propionamide 4-methylpentane, 2-iodo-2-(2-imidazolin-2-yl)propane, 2-iodo-2-(2-(5-methyl-2-imidazolin-2-yl)propane, and the like. One of these halide compounds may be used alone, or a combination of two or more of the halide compounds may be used.

According to the method of the present invention, since the organic halide used as a low molecular weight dormant species is not to be used as a solvent, it is not necessary to use the organic halide in such a large amount so as to provide an effect as a solvent. Thus, the amount of the organic halide used as a low molecular weight dormant species can be limited to an amount smaller than the so-called "solvent amount" (that is, an amount needed to achieve the effect as a solvent). In the method of the present invention, since the organic halide used as a low molecular weight dormant species is used to provide a halogen as a protecting group to a growing chain as described above, it is sufficient so long as a sufficient amount of halogen can be provided to the growing chains in the reaction system. Specifically, for example, in the method of the present invention, the amount of the organic halide used as a low molecular weight dormant species is preferably 0.5 moles or less relative to 1 mole of the vinyl-type monomer. More preferably, the amount is 0.4 moles or less relative to 1 mole of the vinyl-type monomer. Further preferably, the amount is 0.3 moles or less relative to 1 mole of the vinyl-type monomer. Particularly preferably, the amount is 0.2 moles or less relative to 1 mole of the vinyl-type monomer. Most preferably, the amount is 0.1 moles or less relative to 1 mole of the vinyl-type monomer. Further, if necessary, the amount can be 0.07 moles or less, 0.05 moles or less, 0.03 moles or less, 0.02 moles or less, or 0.01 moles or less relative to 1 mole of the vinyl-type monomer. Additionally, the amount is preferably 0.001 moles or more relative to 1 mole of the vinyl-type monomer. More preferably, the amount is 0.005 moles or more relative to 1 mole of the vinyl-type monomer.

The amount of the organic halide used as a low molecular weight dormant species in the method of the present invention is preferably 1 millimoles or more, more preferably 2 millimoles or more, and further preferably 5 millimoles or more relative to 1 liter of reaction solution, as a concentration in the polymerization reaction solution. Optionally, it is also possible that the amount is 10 millimoles or more. It is also possible that the amount is 20 millimoles or more. It is also possible that the amount is 30 millimoles or more. Moreover, the amount is preferably 500 millimoles or less, more preferably 200 millimoles or less, further preferably 150 millimoles or less relative to 1 liter of reaction solution. It is also possible that the amount is 120 millimoles or less relative to 1 liter of reaction solution. It is also possible that the amount is 100 millimoles or less relative to 1 liter of reaction solution.

Most of the aforementioned organic halides used as low molecular weight dormant species are known compounds. Reagents and the like, which are sold from reagent sellers or the like, can directly be used. Alternatively, the compounds may be synthesized using conventionally known synthesizing methods.

In regard to an organic halide used as a low molecular weight dormant species, it is also possible that raw materials thereof are introduced so as to generate the organic halide in situ, i.e. in the reaction solution, during the polymerization, such that the product can be used as the organic halide for this polymerization method. For example, an azo-type radical initiator (e.g., azobis(isobutyronitrile)) and a molecule as a simple substance of halogen (e.g., iodine ($I_2$)) can be introduced as raw materials, the reaction of the two can generates an organic halide (e.g., CP-I (the chemical formula is as described above), which is an alkyl iodide) in situ during the polymerization, and this product can be used as a dormant species for this polymerization method. When an azo-type radical initiator (for example, azobis(isobutyronitrile)) and a molecule as a simple substance of halogen (for example, iodine ($I_2$)) are used as raw material, although their amounts are not limited particularly, it is preferred that the amounts are adjusted such that the amount of the produced organic halide is the aforementioned amount of the organic halide. That is, it is preferred to use the molecule as a simple substance of halogen and the azo-type radical initiator in such amounts that corresponds to the amount of the organic halide to be used.

As for the organic halide used as a low molecular weight dormant species, it is also possible to use a compound that is immobilized at a surface such as an inorganic or organic solid surface, or an inorganic or organic molecular surface. For example, an organic halide immobilized on a silicon substrate surface, a polymer film surface, an inorganic or organic microparticle surface, a pigment surface, or the like, can be used. The immobilization can be achieved utilizing, for example, chemical binding, physical binding or the like.

(Monomer)

As a monomer, the polymerization method of the present invention uses a radical polymerizable monomer. A radical polymerizable monomer refers to a monomer having an unsaturated bond which may be subjected to a radical polymerization under the presence of an organic radical. Such an unsaturated bond may be a double bond or triple bond. That is, the polymerization method of the present invention can use an arbitrary monomer, which is conventionally known as a monomer for performing a living radical polymerization.

More specifically, the so-called vinyl monomers can be used. Vinyl monomer is a general name for monomers which are represented by the general formula "$CH_2=CR^5R^6$."

A monomer having the general formula in which $R^5$ is methyl, and $R^6$ is carboxylate, is referred to as a methacrylate-type monomer, and can preferably be used in the present invention.

Specific examples of the methacrylate-type monomer include methyl methacrylate, ethyl methacrylate, propyl methacrylate, n-butyl methacrylate, t-butyl methacrylate, hexyl methacrylate, 2-ethylhexyl methacrylate, nonyl methacrylate, benzyl methacrylate, glycidyl methacrylate, cyclohexyl methacrylate, lauryl methacrylate, n-octyl methacrylate, 2-methoxyethyl methacrylate, butoxyethyl methacrylate, methoxytetraethyleneglycol methacrylate, 2-hydroxyethyl methacrylate, 2-hydroxypropyl methacrylate, 3-chloro-2-hydroxypropyl methacrylate, tetrahydrofurfuryl methacrylate, 2-hydroxy-3-phenoxypropyl methacrylate, diethyleneglycol methacrylate, polyethylene glycol methacrylate, 2-(dimethylamino)ethyl methacrylate, 2-isocyanoethyl methacrylate, 2-(acetoacetoxy)ethyl methacrylate, 2-(Methacryloyloxy)ethyl phosphate, trialkoxysilylpropyl methacrylate, dialkoxymethylsilyl methacrylate and the like. Further, methacrylic acid or its alkali metal salt, alkali earth metal salt or amine salt can be used. In addition, it is possible to use ion liquid type methacrylates such as 2-(N,N-diethyl-N-methylamino)ethyl methacrylate$^+$/trifluorosulfonyliminium($N(CF_3SO_2)_2^-$) salt, 2-(N-ethyl-N-methyl-N-hydrogenated amino)ethyl methacrylate$^+$/trifluorosulfonyliminium($N(CF_3SO_2)_2^-$) salt, 1-ethyl-3-methylimidazolium methacrylate$^+$/fluorohydrogenation (($FH)_nF^-$) salt, N-ethyl-N-methylpyrrolidinium methacrylate$^+$/fluorohydrogenation(($FH)_nF^-$) salt.

The aforementioned vinyl monomers having the aforementioned general formula in which $R^5$ is hydrogen and $R^6$ is carboxylate, are generally referred to as acrylic type monomers and can preferably be used in the present invention.

Specific examples of the acrylate-type monomer include methyl acrylate, ethyl acrylate, propyl acrylate, n-butyl acrylate, t-butyl acrylate, hexyl acrylate, 2-ethylhexyl acrylate, nonyl acrylate, benzyl acrylate, glycidyl acrylate, cyclohexyl acrylate, lauryl acrylate, n-octyl acrylate, 2-methoxyethyl acrylate, butoxyethyl acrylate, methoxytetraethyleneglycol acrylate, 2-hydroxyethyl acrylate, 2-hydroxypropyl acrylate, 3-chloro-2-hydroxypropyl acrylate, tetrahydrofurfuryl acrylate, 2-hydroxy-3-phenoxypropyl acrylate, diethyleneglycol acrylate, polyethylene glycol acrylate, 2-(dimethylamino)ethyl acrylate, 2-isochanoethyl acrylate, 2-(acetoacetoxy)ethyl acrylate, 2-(acryloyloxy)ethyl phosphate, trialkoxysilylpropyl acrylate, dialkoxymethylsilyl acrylate and the like. Further, an acrylic acid or its alkali metal salt, alkali earth metal salt or amine salt can be used. In addition, it is possible to use ion liquid type acrylates such as 2-(N,N-diethyl-N-methylamino)ethyl acrylate$^+$/trifluorosulfonyliminium(N($CF_3SO_2)_2^-$) salt, 2-(N-ethyl-N-methyl-N-hydrogenated amino)ethyl acrylate⁺/trifluorosulfonyliminium(N(CF$_3$SO$_2$)$_2^-$) salt, 1-ethyl-3-methylimidazolium acrylate⁺/fluorohydrogenation((FH)$_n$F$^-$) salt, N-ethyl-N-methylpyrrolidinium acrylate⁺/fluorohydrogenation((FH)$_n$F$^-$) salt.

A monomer having the aforementioned general formula of a vinyl monomer, in which $R^5$ is hydrogen and $R^6$ is phenyl, is styrene, can be suitably used in the present invention. A monomer, in which $R^6$ is phenyl or a phenyl derivative, is referred to as a styrene derivative, and can be suitably used in the present invention. Specifically, such a monomer includes o-, m-, or p-methoxystyrene, o-, m-, or p-t-butoxystyrene, o-, m-, or p-chloromethylstyrene, o-, m-, or p-chlorostyrene, o-, m-, or p-hydroxystyrene, o-, m-, or p-styrenesulfonic acid, o-, m-, or p-aminostyrene and the like. Further, a monomer in which $R^6$ is aromatic, (for example, vinylnaphthalene) can be used.

A monomer having the aforementioned general formula of a vinyl monomer, in which $R^5$ is hydrogen and $R^6$ is alkyl, is alkylene, and can be suitably used in the present invention.

In the present invention, monomers having two or more vinyl groups can be also used. Specifically, for example, a diene-type compound (e.g., butadiene, isoprene, and the like), a compound having two allyl groups (for example, diallyl phthalate and the like), a dimethacrylate having two methacryl groups (e.g., ethylene glycol dimethacrylate), a diacrylate having two acryl groups (e.g., ethylene glycol diacrylate), and the like, can be used.

Vinyl monomers other than those described above can also be used in the present invention. Specifically, for example, vinyl esters (for example, vinyl acetate, vinyl propionate, vinyl benzoate, vinyl acetate), vinylpyridines (for example, 2-, 3-, or 4-vinylpyridine), styrene derivatives other than the aforementioned styrene derivatives (for example, α-methylstyrene), vinyl ketones (for example, vinyl methyl ketone, vinyl hexyl ketone, methyl isopropenyl ketone), N-vinyl compounds (for example, N-vinyl pyrrolidone, N-vinyl pyrrole, N-vinyl carbazole, N-vinyl indole), (meth)acrylamide and its derivatives (for example, N-isopropyl acrylamide, N-isopropylmethacrylamide, N,N-dimethylacrylamide, N,N-dimethylmethacrylamide, N-methylolacrylamide, N-methylolmethacrylamide), acrylonitrile, methacrylonitrile, maleic acid and its derivatives (for example, maleic anhydride), halogenated vinyls (for example, vinyl chloride, vinylidene chloride, tetrachloroethylene, hexachloropropylene, vinyl fluoride), olefins (for example, ethylene, propylene, 1-hexene, cyclohexene), and the like.

One of these radical-polymerizable monomers may be used alone, or a combination of two or more of the radical-polymerizable monomers may be used.

(Radical Reaction Initiator)

In the living radical polymerization method of the present invention, as the occasion demands, a small amount of a radical initiator may be used. Initiators, which are known as initiators to be used for a radical reaction, can be used as the radical initiator. For example, azo-type radical initiators and peroxide-type radical initiators can be used. Specific examples of azo-type radical initiators include, for example, azobis(isobutyronitrile) (AIBN), 2,2'-azobis(4-methoxy-2,4-dimethylvaleronitrile) (V70), 2,2'-azobis(2,4-dimethylvaleronitrile) (V65). Specific examples of peroxide-type radical reaction initiators include, for example, benzoylperoxide (BPO), dicumyl peroxide, t-butyl peroxybenzoate (BPB), di(4-tert-butylcyclohexyl) peroxydicarbonate (PDX), and potassium peroxodisulfate.

The amount of the radical initiator used is not limited particularly. However, it is preferably 1 millimoles or more, more preferably 5 millimoles or more, further preferably 10 millimoles or more relative to 1 liter of the reaction solution. In one embodiment, the amount is 20 millimoles or more. Moreover, the amount is preferably 500 millimoles or less. In one embodiment, the amount is 200 millimoles or less. In another embodiment, the amount is 150 millimoles or less. It is also possible that the amount is 120 millimoles or less relative to 1 liter of the reaction solution. More preferably, the amount is 100 millimoles or less. It is also possible that the amount is 90 millimoles or less. It is also possible that the amount is 80 millimoles or less. It is also possible that the amount is 70 millimoles or less. It is also possible that the amount is 60 millimoles or less. Further preferably, the amount is 50 millimoles or less.

(Solvents)

When a reaction mixture of a monomer and other ingredients is liquid at the reaction temperature, it is not always necessary to use a solvent. If necessary, a solvent may be used. Solvents, which were conventionally used for a living radical polymerization, can be used in the method of the present invention. When a solvent is to be used, the amount of use is not particularly limited as long as the polymerization reaction is appropriately carried out; however, it is preferable to use a solvent in an amount of 1 part by weight or more relative to 100 parts by weight of the monomer, more preferable to use 10 parts by weight or more, and even more preferable to use 50 parts by weight or more relative to 100 parts by weight of the monomer. When the amount of use of the solvent is too small, the viscosity of the reaction solution may be excessively high. Furthermore, it is preferable to limit the amount to 2000 parts by weight or less, more preferable to limit the amount to 1000 parts by weight or less, and even more preferable to limit the amount to 500 parts by weight or less relative to 100 parts by weight of the monomer. In one embodiment, the amount is 300 parts by weight or less relative to 100 parts by weight of monomer. It is also possible that the amount is 200 parts by weight or less relative to 100 parts by weight of monomer. It is also possible that the amount is 150 parts by weight or less relative to 100 parts by weight of monomer. It is also possible that the amount is 120 parts by weight or less relative to 100 parts by weight of monomer. It is also possible that the amount is 100 parts by weight or less relative to 100 parts by weight of monomer. When the amount of use of the solvent is too large, the monomer concentration in the reaction solution may be excessively low.

Emulsion polymerization, dispersion polymerization or suspension polymerization can also be carried out by using a solvent that is not miscible with the monomer. For example, in the case of using styrene or methacrylate as the monomer, water can be used as the solvent, such that emulsion polymerization, dispersion polymerization or suspension polymerization can be carried out.

(Other Additives and the Like)

To the various aforementioned materials used for the living radical polymerization, known additives and the like may be added as necessary, in their required amounts. Examples of such additives include, for example, a polymerization suppressant and the like.

(Raw Material Composition)

By mixing the various raw materials described above, a raw material composition that is appropriate as a material for the living radical polymerization is obtained. The obtained composition can be used in the methods of the present invention for a living radical polymerization.

In one embodiment, the raw material composition comprises a monomer having a radical-reactive unsaturated bond, a radical initiator, an organic halide having a carbon-halogen bond (or the raw material of an organic halide, such as an azo-type radical initiator and a halogen molecule) used as a low molecular weight dormant species, and may further include a solvent if needed.

According to one embodiment, the raw material composition does not include any raw material other than the various raw materials described above. For example, it is preferable, from the viewpoint of environmental problems and the like, that the raw material composition does not substantially include a raw material containing a transition metal. According to a preferred embodiment, the raw material composition does not substantially include any raw material other than a monomer having a radical-reactive unsaturated bond, a radical initiator, a solvent, and an organic halide having a carbon-halogen bond used as a low molecular weight dormant species (or the raw material of an organic halide, such as an azo-type radical initiator and a halogen molecule). That is, in one embodiment, the raw material composition is a composition substantially consisting of a monomer having a radical-reactive unsaturated bond, a radical initiator, an organic halide having a carbon-halogen bond (or the raw material of an organic halide, such as an azo-type radical initiator and a halogen molecule) used as a dormant species, and a solvent. Here, if not needed, the solvent may not be contained.

It is also preferable that the raw material composition does not substantially include any material irrelevant to a living radical polymerization (for example, an episulfide compound or the like).

In a preferred embodiment, the raw material composition does not comprise a catalyst. However, the raw material composition may comprise a catalyst as the occasion demands. If the raw material composition comprises a catalyst, the raw material composition comprises, for example, a catalyst, a monomer having a radical-reactive unsaturated bond, an organic halide having a carbon-halogen bond (or the raw material of an organic halide, such as an azo-type radical initiator and a halogen molecule) used as a dormant species, and a radical initiator, and may further include a solvent as the occasion demands. Preferably, the raw material composition does not substantially comprise materials other than a catalyst, a monomer having a radical-reactive unsaturated bond, an organic halide having a carbon-halogen bond (or the raw material of an organic halide, such as an azo-type radical initiator and a halogen molecule) used as a dormant species, a radical initiator, and a solvent.

(Reaction Temperature)

A reaction temperature in the method of the present invention is not particularly limited. Preferably, the reaction temperature is 10° C. or more. More preferably, the reaction temperature is 20° C. or more. Further preferably, the reaction temperature is 30° C. or more. Still preferably, the reaction temperature is 40° C. or more. Particularly preferably, the reaction temperature is 50° C. or more. Additionally, the reaction temperature is preferably 130° C. or less. More preferably, the reaction temperature is 120° C. or less. Further preferably, the reaction temperature is 110° C. or less. Still preferably, the reaction temperature is 105° C. or less. Particularly preferably, the reaction temperature is 100° C. or less.

When the reaction temperature is too high, there is a disadvantage in that heating facilities and the like may be expensive. When the reaction temperature is at room temperature or lower, there is a disadvantage that cooling facilities and the like may be expensive. Additionally, if a reaction mixture is prepared such that polymerization occurs at room temperature or lower, the reaction mixture is unstable at room temperature and may react. Therefore, there is the disadvantage that it is difficult to store the reaction mixture. Therefore, the aforementioned range of the temperature, which is slightly higher than room temperature but is not too high (for example, 50° C. to 100° C.) is very preferable in terms of practical sense.

(Reaction Period of Time)

The reaction time period in the method of the present invention is not particularly limited. Preferably, the reaction time period is 15 minutes or more. More preferably, the reaction time period is 30 minutes or more. Further preferably, the reaction time period is 1 hour or more. Additionally, the reaction time period is preferably 3 days or less. More preferably, the reaction time period is 2 days or less. Further preferably, the reaction time period is 1 day (24 hours) or less.

If the reaction time period is too short, it is difficult to obtain a sufficient molecular weight (or a ratio of polymerization (conversion ratio of monomer)). If the reaction time period is too long, the efficiency of the entire process would be unsatisfactory. Advantageous results (an adequate monomer conversion and reduction of a side reaction) may be achieved by selecting a suitable reaction time period.

(Oxygen in Reaction Vessel)

In the polymerization reaction of the method of the present invention, the amount of oxygen in the gaseous phase in the reaction vessel is controlled. By doing so, an appropriate amount of oxygen is provided in the reaction solution. That is, during the polymerization, a desired amount of oxygen (preferably, 1 to 70 mM of oxygen molecule relative to 1 L of the volume of the liquid phase in a reaction vessel) is provided in the reaction solution.

The amount of the oxygen is preferably 1 millimoles or more, and more preferably, 1.5 millimoles or more relative to 1 L of the volume of liquid phase in a reaction vessel. In one embodiment, it is also possible that the amount of the oxygen is 2 millimoles or more relative to 1 L of the volume of liquid phase in a reaction vessel. In one embodiment, it is also possible that the amount of the oxygen is 2.5 millimoles or more relative to 1 L of the volume of liquid phase in a reaction vessel. In one embodiment, it is also possible that the amount of the oxygen is 3 millimoles or more relative to 1 L of the volume of liquid phase in a reaction vessel. In one embodiment, it is also possible that the amount of the oxygen is 3.5 millimoles or more relative to 1 L of the volume of liquid phase in a reaction vessel. In one embodiment, it is also possible that the amount of the oxygen is 4 millimoles or more relative to 1 L of the volume of liquid phase in a reaction vessel. Moreover, the amount of the oxygen is preferably 70 millimoles or less, more preferably, 60 millimoles or less, further preferably, 50 millimoles or less, still preferably, 40 millimoles or less, particularly preferably, 30 millimoles or less, relative to 1 L of the volume of liquid phase in a reaction vessel. In one embodiment, it is also possible that the amount of the oxygen is 25 millimoles or less. In one embodiment, it is also possible that the amount of the oxygen is 20 millimoles or less.

When oxygen is provided, the air can be used, or mixed gas prepared by mixing oxygen and an inert gas can be used. If a mixed gas prepared by mixing oxygen and an inert gas is used, the oxygen concentration is preferably 0.1% by volume or more, more preferably 0.5% by volume or more, and further preferably 1% by volume or more. In one embodiment, it is also possible that the oxygen concentration is 2% by volume or more. In one embodiment, it is also possible that the oxygen concentration is 3% by volume or more. In one embodiment, it is also possible that the oxygen concentration is 4% by volume or more. In one embodiment, it is also possible that the oxygen concentration is 5% by volume or more. Moreover, the concentration is preferably 15% by volume or less, more preferably 12% by volume or less, and further preferably 10% by volume or less. In one embodiment, it is also possible that the oxygen concentration is 9% by volume or less. In one embodiment, it is also possible that the oxygen concentration is 8% by volume or less. In one embodiment, it is also possible that the oxygen concentration is 7% by volume or less. In one embodiment, it is also possible that the oxygen concentration is 6% by volume or less.

Also the amount of the oxygen can be adjusted by adjusting the volume of the gaseous phase in the reaction vessel.

As the method for providing oxygen into the reaction solution, it is possible to use any method. Specifically, for example, an appropriate amount of oxygen is provided in the polymerization reaction by charging the reaction solution in the reaction vessel, and thereafter, introducing a mixed gas obtained by mixing a desired amount of oxygen and an inert gas (for example, argon or nitrogen) into the vessel to replace the gaseous phase in the vessel with the mixed gas, and thereafter performing a polymerization reaction.

Now, in one embodiment, all the air initially which existed in the reaction vessel is eliminated by introducing the mixed gas consisting of a certain concentration of oxygen and an inert gas into the reaction vessel. That is, the air in the reaction vessel is replaced with the mixed gas having a composition different from that of the air. However, as the occasion demands, a portion or all of the air which initially existed in the reaction vessel can be used to provide oxygen into the reaction solution. Moreover, in some cases, it is possible that only the air initially existed in the reaction vessel is used to provide oxygen into the reaction solution without introducing mixed gas.

Also, the air pressure of the gaseous phase in the reaction vessel is preferably the atmospheric pressure in view of the ease of the handling and the like. However, as the occasion demands, the air pressure above the atmospheric pressure may be used, and the air pressure below the atmospheric pressure may be used.

The reaction vessel used is not particularly limited. However, in a preferred embodiment, a polymerization reaction is carried out within a sealed vessel. In the case of a reaction vessel which is not sealed, the polymerization reaction is carried out while controlling the amount of the oxygen moving between the inside and the outside of the reaction vessel.

In a preferred embodiment, the reaction is carried out while the vessel is sealed until the polymerization reaction is completed. According to one preferred embodiment, the concentration and amount of the oxygen within the reaction vessel is adjusted so as to provide the above-mentioned desired amount of oxygen in the reaction solution, and thereafter the vessel is sealed and the polymerization reaction is carried out.

As the occasion demands, the vessel can be opened and/or closed during the polymerization reaction. However, in such a case, it is necessary to control the amount of the oxygen entering the vessel so as not to exceed an appropriate amount.

It is preferred that the above-mentioned desired amount of oxygen is provided in the reaction vessel at the time of initiating the polymerization reaction. However, as the occasion demands, it is possible that a portion of the oxygen is provided in the reaction vessel at the time of initiating the reaction and the remainder is provided in the reaction vessel after the initiation of the reaction.

(Stirring)

In the method of the present invention, preferably, the reaction is carried out while continuing the stirring of the reaction solution. By stirring, the oxygen in the gaseous phase in the vessel is promoted to enter the reaction solution.

The stirring can be carried out by conventionally known methods. However, according to the present invention, it is necessary to limit the oxygen in the gaseous phase within the vessel. Therefore, unlimited inflow of the air from the outside to the inside of the reaction vessel must be avoided. For this purpose, when a propeller is used for stirring, it is preferable to decrease the gap between the shaft of the propeller and the vessel as much as possible. For example, it is preferable to use grease or the like to narrow the gap around the shaft of the propeller so that substantially no oxygen flows in. Alternatively, it is preferable to use a stirring means which can be operated remotely from the outside, such as a magnetic stirrer.

It is preferable to stir the reaction solution by using a motor to rotate a stirring shaft on which stirring wings are mounted or by using a magnetic stirrer, while introducing a mixed gas of an inert gas and oxygen (for example, nitrogen gas containing 1% of oxygen) continuously or intermittently to maintain a slightly pressurized condition (for example, a pressure 1 to 5% higher than the air pressure outside the reaction vessel), so as not to produce a negative pressure within the reaction vessel.

A shaft driving (rotation) portion, where a stirring shaft is attached to the reaction vessel, can prevent the air from entering from the outside to the inside by the method of sealing electromagnetically or the method of sealing with water or oil. Further, it is preferable to maintain the inside of the reaction vessel in a pressurized condition (for example, a pressure 1 to 5% higher than the air pressure outside the reaction vessel) because the entry of the outer air can be avoided even if there is a gap at the shaft driving portion.

As the method for introducing oxygen, methods can be used wherein an oxygen-containing gas of a predetermined concentration is allowed to flow into the space in the reaction vessel or bubbled into the reaction solution, continuously or intermittently.

The method for living radical polymerization of the present invention can be applied to homopolymerization, that is, production of a homopolymer, and it is also possible to produce a copolymer using the method of the present invention in copolymerization. The copolymerization may be random copolymerization, or may also be block copolymerization.

The block copolymer may be a copolymer having two or more types of blocks linked together, or may be a copolymer having three or more types of blocks linked together.

In the case of block copolymerization using two types of blocks, for example, a block copolymer can be obtained by a method including a step of polymerizing a first block and a step of polymerizing a second block. In this case, the method of the present invention may be used in the step of polymerizing the first block, or the method of the present invention may be used in the step of polymerizing the second block. It is preferable to use the method of the present invention in both of the process of polymerizing the first block and the process of polymerizing the second block.

More specifically, for example, a block copolymer can be obtained by polymerizing the first block, and then carrying out the polymerization of the second block in the presence of the obtained first polymer. The first polymer can be supplied to the polymerization of the second block after isolation and purification, or the polymerization of blocks can also be carried out by adding the second monomer to the first polymerization in the middle of or at the completion of the polymerization of the first polymer, without isolation and purification of the first polymer.

Also in the case of producing a block copolymer having three types of blocks, the steps of polymerizing the respective blocks are carried out in the same manner as in the instance of producing a copolymer having two or more types of blocks linked together, and thereby a desired copolymer can be obtained. It is preferable to use the method of the present invention in all of the block polymerization steps.

(Reaction Mechanism)

Although the present invention is not particularly bound to a theory, an inferred mechanism will be explained.

The basic concept of a living radical polymerization method is a reversible activating reaction of a dormant species (polymer-X) to a growing chain radical (polymer•). A method, which uses a halogen as protecting group X and uses a transition metal complex as an activating catalyst, is one of the useful living radical polymerization methods. According to the present invention, it is not required to use a catalyst. It is possible to abstract a halogen from an organic halide with high reactivity. It is possible to produce a radical reversibly.

It has been recognized that, generally, a transition metal can have electrons in various transition states and therefore, a transition metal is superior in the catalytic activity for various chemical reactions. Therefore, regarding catalysts suitable for a living radical polymerization, it is considered that a transition metal is superior.

However, unexpectedly, according to the present invention, even if a catalyst compound is not added, the polymerization reaction proceeds with very high efficiency.

The following Scheme 1 shows the reaction formula in the case of using a catalyst in the living radical polymerization.

(Scheme 1)

[Formula 17]

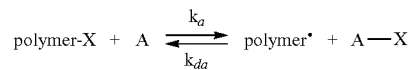

wherein A is a catalyst, and A abstracts a halogen atom (X) in a dormant species and thereby a growing radical can be obtained reversibly.

It is believed that in the method of the present invention, an oxygen-containing gaseous phase is introduced into a reaction vessel, and thereby the living radical polymerization reaction is controlled by the mechanism in which (1) the oxygen acts as the catalyst (A), or by the mechanism in which (2) the oxygen and a compound within the system react in the system to provide some compound, which acts as the catalyst (A or A-X).

(Removal of Halogen Bound to an End of Produced Polymer)

The produced polymer that is obtained by the method of the present invention has halogen (for example, iodine) at the chain end. When this polymer is to be used in products, if needed, the polymer can be used after removing the halogen at the end. It is also possible to positively utilize the halogen at the end and to convert this into a different functional group, so as to bring out a new function. The reactivity of the halogen at the end is generally high, and the removal or conversion of the halogen can be carried out by a wide variety of reactions. For example, examples of methods of treating the polymer end when the halogen is iodine, will be shown in the following scheme. The polymer end can be utilized by the reactions shown in these schemes or the like. Even when the halogen is other than iodine, the polymer end can be converted into a functional group in the same manner.

(Scheme 3)

[Formula 19]

Conversion of terminal iodine

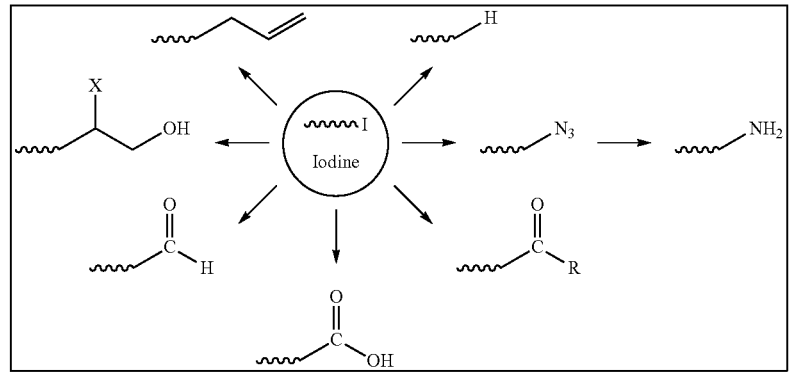

Simple removal/conversion of terminal iodine

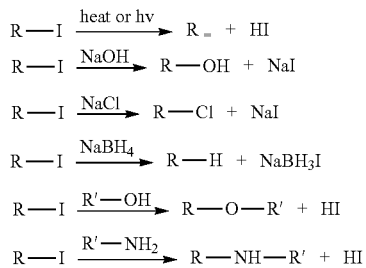

(Reference) Matyjaszewski, K., Davis, T. P., Eds.; *Handbook of Radical Polymerization*; Wiley & Sons: New York, 2002.

(Use of the Polymer)

According to the aforementioned living radical polymerization method of the present invention, a polymer having narrow molecular weight distribution is obtained. For example, it is possible to select a suitable formulation of reaction material, reaction conditions and the like, such that a polymer having the $M_w/M_n$ ratio, which is the ratio of the weight average molecular weight $M_w$ to the number average molecular weight $M_n$, is 1.5 or less. It is also possible to select a further suitable formulation of the reaction material and reaction conditions such that a polymer having the $M_w/M_n$ ratio of 1.4 or less, a polymer having the $M_w/M_n$ ratio of 1.3 or less, a polymer having the $M_w/M_n$ ratio of 1.2 or less, or a polymer having the $M_w/M_n$ ratio of 1.1 or less is obtained. It is noted that according to the living radical polymerization method of the present invention, also when the halogen atom in the organic halide used as a dormant species is a bromine, it is possible to obtain a polymer having the $M_w/M_n$ ratio of 2.0 or less, and a polymer having a narrower molecular weight distribution than conventional radical polymerization method is obtained. As described above, a bromine compound is more stable than an iodine compound. Therefore, the necessity for removing terminal halogen from the produced polymer is relatively low, and the utility of the obtained polymer is quite high. Further, many compounds having a plurality of bromine are commercially sold or can be easily synthesized. Therefore, polymers having various topologies (branches) such as star-type polymer, comb-type polymer, and surface graft polymer can be easily obtained. Therefore, also when the halogen atom in the aforementioned organic halide is bromine, the obtained polymer can be preferably used for the uses described below.

The polymer obtained by the living radical polymerization method of the present invention can be applied for various uses. For example, the polymer can be used for manufacturing materials for resistor, adhesives, lubricants, paint, ink, dispersants, packaging materials, pharmaceuticals, personal care products (such as hairdressing material, cosmetics, and the like), elastomers (such as material for automobiles, industrial articles, sports article, materials for coating electrical wire, materials for buildings, and the like), coating materials (such as materials for powder coating, and the like), and the like. Furthermore, it can be used for creating a new electronic material, optical material, dynamic material, crystal material, separation material, lubricant material, and medical material.

According to the living radical polymerization method of the present invention, when a catalyst is not used, the resulting polymer does not contain a compound derived from the catalyst (catalyst residue). In this point, the resulting polymer can be used in a wide range of use. That is, according to the present invention, the resulting resin (polymer) has high purity, and the polymer can be suitably used in the applications where a high purity resin is required. When a catalyst is used, the catalyst residue may be removed from the produced polymer, or may not be removed, depending on the application. The polymer may be molded, or dissolved or dispersed in a solvent or a dispersion medium depending on the various applications. However, the molded polymer, or the dissolved or dispersed polymer also maintains the advantages of the present invention, and thus these polymers still belong to the scope of the polymer obtained by the polymerization method of the present invention.

The polymer synthesized using the polymerization method of the present invention has advantages such as the advantage that the molecular weight distribution is narrow, the advantage that the polymer contains little or no compound derived from the catalyst, and the advantage that the cost is low, and thus the polymer can be utilized in various applications by making the best use of these advantages.

For example, a homopolymer, a random copolymer and a block copolymer formed from benzyl methacrylate and having narrow molecular weight distribution, can be used as high performance materials for resistor.

Further, for example, a polymer of methacrylate (for example, dimethylaminomethacrylate or 2-hydroxyethyl methacrylate), methacrylic acid, acrylate, acrylic acid or the like can be used in applications such as adhesives, paints, inks and pigment dispersants.

Further, when a polybranched polymer is synthesized by the method of the present invention, the polymer is useful as a lubricant.

Further, polymers obtained by the method of the present invention (for example, hydroxyethyl methacrylate, polyethylene glycol methacrylate, and the like) are also useful as drug sustained-release materials or medical materials.

Further, polymers obtained by the method of the present invention (for example, dimethylaminomethacrylate, methacrylic acid, 2-hydroxyethyl methacrylate, polyethylene glycol methacrylate, and the like) are also useful for personal care products (for example, hairdressing materials or cosmetic products).

Further, polymers obtained by the method of the present invention (for example, acrylate, methacrylate, styrene, diene and the like) are also useful in applications such as elastomer or coating.

Further, polymers obtained by the method of the present invention are also useful in the creation and production of non-conventional new electronic materials, optical materials, mechanical materials, crystalline materials, separation materials, lubricant materials, medical materials and the like.

Furthermore, the method of the present invention can be, for example, applied to surface graft polymerization, and can produce high density polymer brushes that can be used in various applications.

Further, a polymer that can be suitably used even in applications where the absence of any residual electroconductive impurities in the polymer is required (for example, resist materials, organic electroluminescence materials and the like), is obtained.

EXAMPLES

Hereinafter, Examples of the present invention will be explained. However, the present invention is not limited by these Examples.

Example 1

Polymerization of Methyl Methacrylate (MMA)

(Entry 1)

80 mM of 2-cyanopropyl iodide (CP-I; the chemical structural formula is as described above) was used as an alkyl halide to be a low molecular weight dormant species. A catalyst was not used. 20 mM of AIBN was used as a radical initiator. These materials were dissolved in methyl methacrylate (MMA) to obtain a reaction solution of the above-mentioned concentrations. The monomer concentration was about 8 M. The solubilities of these materials were satisfactory, and a homogenous solution was formed. This solution was charged in a vessel having a capacity of 33 ml. The amount of the reaction solution charged into the vessel is shown in the following tables. The air in the vessel was replaced with oxygen-argon mixed gas containing 1% of oxygen (i.e., a mixture of 1% by volume of oxygen and 99% by volume of argon), and the vessel was sealed. The solution was stirred with a magnetic stirrer. The stirring was continued with the vessel sealed while the rotation of the stirring bar was controlled by remote operation from the outside of the vessel, and the reaction solution was heated to 80° C. to perform the polymerization reaction. The formulation of the experiment and the amounts of the reaction solution are shown in table 1A. Further, the reaction temperatures, times, and results are shown in table 1B.

It is noted that regarding concentrations, "mM" refers to the number of millimoles relative to 1 liter of a monomer. For example, 80 mM means that 80 millimoles of a solute is dissolved in 1 liter of a monomer. Regarding concentrations, "M" refers to the number of moles relative to 1 liter of a monomer. For example, 8 M means that 8 moles of a solute is dissolved in 1 liter of a monomer. It is noted that in the case of MMA, 1 liter of a monomer (bulk) is 8 moles at room temperature.

In addition, in the following tables, regarding the type of gas, the proportion of oxygen in the gaseous phase within the vessel is shown in % by volume. Regarding oxygen concentration, the volume of the liquid phase of the initial number of moles (mM) before the initiation of reaction of $O_2$ in the gaseous phase within the reaction vessel relative to 1 L of the volume of the liquid phase within the reaction vessel is described.

(Entries 2 to 5)

The experiments were carried out in the same manner as in the experiments of the aforementioned entry 1 except that the amounts of gaseous phase and liquid phase were changed as shown in the following tables. The experimental results are shown in the following tables.

The living radical polymerization was controlled when oxygen concentration was between 4 mM and 26 mM. In addition, when the concentrations of AIBN and CP-I were changed, the living radical polymerization was controlled.

In the following tables, PDI denotes the ratio of $M_w/M_n$. Further, $M_n$ is a number average molecular weight of the obtained polymer.

$M_{n,theo}$ denotes a theoretical value calculated according to the following formula:

$$M_{n,theo} = ([M]_0/[R-I]_0) \times (\text{molecular weight of the monomer}) \times (\text{conv})/100 \quad \text{[Numerical formula 1]}$$

wherein $[M]_0$ and $[R-I]_0$ are the initial concentrations (charge concentration) of a monomer and an alkyl iodide that is to be used as a dormant species, respectively; and cony is the monomer conversion ratio (polymerization ratio).

From the tacticity of the produced polymers, it was confirmed that the present polymerizations were radical polymerizations. The results are shown in table 1.

In entries 1 to 3, the living radical polymerizations were controlled when the oxygen concentration was changed from 4 mM to 26 mM. In entries 1, 4, and 5, the living radical polymerizations were also controlled by changing the concentrations of AIBN and CP-I.

Comparative Example 1

The experiment was carried out in the same manner as entry 1 in Example 1, except that the amounts of gaseous phase and liquid phase were changed as shown in entry C-1 in the following table. The results are shown in entry C-1 in table 1. A polymer having narrow molecular weight distribution was not obtained. That is, the reaction was not controlled when the oxygen concentration was 0.2 mM.

TABLE 1A

| entry | monomer | R—X | I | $[R-X]_0/[I]_0$ (mM) | type of gas | volume of gaseous phase and liquid phase (mL/mL) | initial moles of $O_2$ in gaseous phase/ volume of liquid phase (mM) |
|---|---|---|---|---|---|---|---|
| 1 | MMA | CPI | AIBN | 80/20 | 1% $O_2$ | 30 (gas)/ 3 (liq.) | 4 mM |
| 2 | MMA | CPI | AIBN | 80/20 | 1% $O_2$ | 32 (gas)/ 1 (liq.) | 12.8 mM |
| 3 | MMA | CPI | AIBN | 80/20 | 1% $O_2$ | 32.5 (gas)/ 0.5 (liq.) | 26 mM |
| 4 | MMA | CPI | AIBN | 80/10 | 1% $O_2$ | 30 (gas)/ 3 (liq.) | 4 mM |
| 5 | MMA | CPI | AIBN | 40/20 | 1% $O_2$ | 30 (gas)/ 3 (liq.) | 4 mM |
| C-1 | MMA | CPI | AIBN | 80/20 | 1% $O_2$ | 11 (gas)/ 22 (liq.) | 0.2 mM |

TABLE 1B

| entry | T (° C.) | t (min) | conv (%) | Mn | Mn, theo | PDI |
|---|---|---|---|---|---|---|
| 1 | 80 | 60 | 50.5 | 3800 | 5000 | 1.23 |
|  |  | 94 | 87.3 | 6500 | 8700 | 1.3 |
| 2 | 80 | 30 | 15.2 | 1900 | 1500 | 1.17 |
|  |  | 60 | 48.1 | 3700 | 4800 | 1.18 |
|  |  | 120 | 94.5 | 6200 | 9400 | 1.29 |
| 3 | 80 | 30 | 7.3 | 1200 | 700 | 1.14 |
|  |  | 60 | 37.6 | 3100 | 3800 | 1.14 |
|  |  | 120 | 71.7 | 6500 | 7200 | 1.32 |
| 4 | 80 | 60 | 26.3 | 2200 | 2600 | 1.19 |
|  |  | 120 | 38.8 | 2900 | 3800 | 1.21 |
|  |  | 180 | 68.6 | 4600 | 6800 | 1.35 |
| 5 | 80 | 60 | 34.3 | 5200 | 6800 | 1.32 |
|  |  | 120 | 87.8 | 12200 | 17500 | 1.39 |
| C-1 | 80 | 30 | 37.6 | 9700 | 3800 | 1.63 |
|  |  | 60 | 76.2 | 7400 | 7600 | 1.89 |
|  |  | 120 | 89.2 | 7200 | 8900 | 1.98 |

Monomer: methyl methacrylate (MMA)
Monomer concentration: 8 M (bulk polymerization)
Alkyl halide to be used as a dormant species (R-I): 2-cyanopropyl iodide (CP-I)
Catalyst was not used.
A radical initiator (In): azobisisobutyronitrile (AIBN).
$M_n$ and PDI: Molecular weight and polydispersity obtained by gel permeation chromatography (GPC) with tetrahydrofuran (THF) as an eluent calibrated by poly(methyl methacrylate) (PMMA) standard.

Example 2 and Comparative Example 2

Polymerization of Methyl Methacrylate (MMA)

The polymerization of methyl methacrylate (MMA) was carried out in the same manner as Example 1, except that the reaction materials and the reaction conditions were changed as shown in the following tables 2A and 2B. The results are shown in tables 2A and 2B.

Entries 1 to 3 are the experiments of Example 2, and entries C-1 and C-5 are the experiments of Comparative Example 2.

In entries 1 to 3, the polymerizations were controlled at the oxygen concentration of 4 mM to 12 mM.

In C-1, the oxygen concentration was 0, and the polymerization was not controlled.

In C-5, the oxygen concentration was 80 mM, and the polymerization was not controlled.

TABLE 2A

| entry | monomer | R—X | I | [R—X]$_0$/[I]$_0$ (mM) | type of gas | volume of gaseous phase and liquid phase (mL/mL) | initial moles of O$_2$ in gaseous phase/volume of liquid phase (mM) |
|---|---|---|---|---|---|---|---|
| C-1 | MMA | CPI | AIBN | 80/20 | 0% O$_2$ (100% Ar) | 30 (gas)/3 (liq.) | 0 mM |
| 1 | MMA | CPI | AIBN | 80/20 | 1% O$_2$ | 30 (gas)/3 (liq.) | 4 mM |
| 2 | MMA | CPI | AIBN | 80/20 | 2% O$_2$ | 30 (gas)/3 (liq.) | 8 mM |
| 3 | MMA | CPI | AIBN | 80/20 | 3% O$_2$ | 30 (gas)/3 (liq.) | 12 mM |
| C-5 | MMA | CPI | AIBN | 80/20 | 21% O$_2$ (atmosphere) | 30 (gas)/3 (liq.) | 84 mM |

TABLE 2B

| entry | T (°C.) | t (min) | conv (%) | Mn | Mn, theo | PDI |
|---|---|---|---|---|---|---|
| C-1 | 80 | 30 | 59.2 | 11300 | 5900 | 1.67 |
|  |  | 60 | 87.2 | 10500 | 8700 | 1.74 |
| 1 | 80 | 60 | 50.5 | 3800 | 5000 | 1.23 |
|  |  | 94 | 87.3 | 6500 | 8700 | 1.3 |
| 2 | 80 | 30 | 30.8 | 5400 | 3100 | 1.53 |
|  |  | 60 | 54.1 | 6800 | 5400 | 1.42 |
| 3 | 80 | 30 | 31.1 | 5400 | 3000 | 1.45 |
|  |  | 60 | 81.3 | 8300 | 8100 | 1.38 |
| C-5 | 80 | 240 | 0 | — | — | — |

Monomer: methyl methacrylate (MMA)

Monomer concentration: 8 M (bulk)

Alkyl halide to be used as a dormant species (R-I): 2-cyanopropyl iodide (CP-I)

Catalyst was not used.

A radical initiator (In): azobisisobutyronitrile (AIBN)

$M_n$ and PDI: Molecular weight and polydispersity obtained by gel permeation chromatography (GPC) with tetrahydrofuran (THF) as an eluent calibrated by poly(methyl methacrylate) (PMMA) standard.

Example 3 and Comparative Example 3

Polymerization of Methyl Methacrylate (MMA)

The polymerization of methyl methacrylate (MMA) was carried out in the same manner as Example 1, except that the reaction materials and the reaction conditions were changed as shown in the following tables. The experimental results are shown in the following tables.

Entries 1 to 4 are the experiments of Example 3, and entry C-1 is the experiment of Comparative Example 3.

In entries 1 to 4, the polymerizations were controlled at the oxygen concentration of 4 mM to 25 mM.

In entry C-1, the oxygen concentration was 80 mM and the polymerization was not controlled.

TABLE 3A

| entry | monomer | R—X | I | [R—X]$_0$/[I]$_0$ (mM) | type of gas | volume of gaseous phase and liquid phase (mL/mL) | initial moles of O$_2$ in gaseous phase/volume of liquid phase (mM) |
|---|---|---|---|---|---|---|---|
| 1 | MMA | CPI | AIBN | 80/20 | 21% O$_2$ (atmosphere) | 11 (gas)/22 (liq.) | 4.2 mM |
| 2 | MMA | CPI | AIBN | 80/20 | 21% O$_2$ (atmosphere) | 16.5 (gas/16.5 (liq.) | 8.4 mM |
| 3 | MMA | CPI | AIBN | 80/20 | 21% O$_2$ (atmosphere) | 20 (gas)/13 (liq.) | 12.6 mM |
| 4 | MMA | CPI | AIBN | 80/20 | 21% O$_2$ (atmosphere) | 25 (gas)/8 (liq.) | 26.3 mM |
| C-1 | MMA | CPI | AIBN | 80/20 | 21% O$_2$ (atmosphere) | 30 (gas)/3 (liq.) | 84 mM |

TABLE 3B

| entry | T (°C.) | t (min) | conv (%) | Mn | Mn, theo | PDI |
|---|---|---|---|---|---|---|
| 1 | 80 | 30 | 28.7 | 3800 | 2900 | 1.23 |
|  |  | 60 | 50.5 | 5100 | 5000 | 1.2 |
|  |  | 120 | 54.2 | 5300 | 5400 | 1.2 |
| 2 | 80 | 30 | 25.4 | 3900 | 2500 | 1.37 |
|  |  | 60 | 30.1 | 4100 | 3000 | 1.35 |
|  |  | 120 | 38.1 | 4200 | 3800 | 1.34 |
| 3 | 80 | 30 | 27.8 | 3500 | 2800 | 1.23 |
|  |  | 60 | 55 | 5500 | 5500 | 1.18 |
|  |  | 120 | 67.3 | 6300 | 6700 | 1.2 |
| 4 | 80 | 30 | 27.2 | 3200 | 2700 | 1.27 |
|  |  | 60 | 46.9 | 4800 | 4700 | 1.19 |
|  |  | 120 | 50.2 | 5000 | 5000 | 1.19 |
| C-1 | 80 | 240 | 0 | — | — | — |

Monomer: methyl methacrylate (MMA)

Monomer concentration: 8 M (bulk)

Alkyl halide to be used as a dormant species (R-I): 2-cyanopropyl iodide (CP-I)

Catalyst was not used.

A radical initiator (In): azobisisobutyronitrile (AIBN), $M_n$ and PDI: Molecular weight and polydispersity obtained by gel permeation chromatography (GPC) with tetrahydrofuran (THF) as an eluent calibrated by poly(methyl methacrylate) (PMMA) standard.

Example 4

Polymerization of Methyl Methacrylate (MMA)

A vessel having a capacity of 33 ml was used as the reaction vessel. In addition, the experiments were carried out in the same manner as the experiment of the aforementioned Example 1, except that the reaction materials and conditions were changed as shown in the following tables. The experimental results are shown in the following tables.

From the results of entries 1 to 4, the polymerization was controlled even if the size of the vessel was enlarged from 33 mL to 198 mL. There were no difference in controllability, and it was found that the controllability did not depend on the size of the vessel.

Monomer: methyl methacrylate (MMA)

Monomer concentration: 8 M (bulk)

Alkyl halide to be used as a dormant species (R-I): 2-cyanopropyl iodide (CP-I)

Catalyst was not used.

A radical initiator (In): azobisisobutyronitrile (AIBN)$_o$ $M_n$ and PDI: Molecular weight and polydispersity obtained by gel permeation chromatography (GPC) with tetrahydrofuran (THF) as an eluent calibrated by poly(methyl methacrylate) (PMMA) standard.

Example 5 and Comparative Example 4

The polymerization of methyl methacrylate (MMA) was carried out in the same manner as Example 1, except that the reaction materials and the reaction conditions were changed as shown in the following tables. The experimental results are shown in the following tables.

Entries 1 to 4 are the experiments of Example 5, and entries C-1, C-3 and C-4 are the experiments of Comparative Example 4.

The polymerization was also controlled in solution polymerization using a solvent having high polarity such as MFDG and 1-butanol.

TABLE 4A

| entry | monomer | R—X | I | $[R—X]_0/[I]_0$ (mM) | type of gas | volume of gaseous phase and liquid phase (mL/mL) | initial moles of $O_2$ in gaseous phase/volume of liquid phase (mM) |
|---|---|---|---|---|---|---|---|
| 1 | MMA | CPI | AIBN | 80/20 | 1% $O_2$ | 30(gas)/3(liq.) | 4 mM |
| 2 | MMA | CPI | AIBN | 80/10 | 1% $O_2$ | 30(gas)/3(liq.) | 4 mM |
| 3 | MMA | CPI | AIBN | 80/20 | 1% $O_2$ | 180(gas)/18(liq.) | 4 mM |
| 4 | MMA | CPI | AIBN | 80/10 | 1% $O_2$ | 180(gas)/18(liq.) | 4 mM |

TABLE 4B

| entry | T (°C.) | t (min) | conv (%) | Mn | Mn, theo | PDI |
|---|---|---|---|---|---|---|
| 1 | 80 | 60 | 50.5 | 3800 | 5000 | 1.23 |
|   |    | 94 | 87.3 | 6500 | 8700 | 1.3 |
| 2 | 80 | 60 | 26.3 | 2200 | 2600 | 1.19 |
|   |    | 120 | 38.8 | 2900 | 3800 | 1.21 |
|   |    | 180 | 68.6 | 4600 | 6800 | 1.35 |
| 3 | 80 | 30 | 41.6 | 5100 | 4200 | 1.35 |
|   |    | 60 | 89.9 | 6400 | 9000 | 1.38 |
| 4 | 80 | 65 | 44.6 | 4300 | 4500 | 1.37 |
|   |    | 120 | 81.7 | 6700 | 8200 | 1.31 |

TABLE 5A

| entry | monomer | R—X | I | $[R—X]_0/[I]_0$ (mM) | type of gas | solvent | volume of gaseous phase and liquid phase (mL/mL) | initial moles of $O_2$ in gaseous phase/volume of liquid phase (mM) |
|---|---|---|---|---|---|---|---|---|
| C-1 | MMA | CPI | AIBN | 40/40 | 0% $O_2$ (100% Ar) | MFDG 50% | 30(gas)/3(liq.) | 0 mM |
| 1 | MMA | CPI | AIBN | 40/40 | 1% $O_2$ | MFDG 50% | 27(gas)/6(liq.) | 1.8 mM |
| 2 | MMA | CPI | AIBN | 40/40 | 1% $O_2$ | MFDG 50% | 30(gas)/3(liq.) | 4 mM |
| C-3 | MMA | CPI | AIBN | 40/40 | 21% $O_2$ (atmosphere) | MFDG 50% | 30(gas)/3(liq.) | 84 mM |
| C-4 | MMA | CPI | AIBN | 40/40 | 1% $O_2$ | 1-butanol 50% | 21(gas)/12(liq.) | 0.7 mM |
| 3 | MMA | CPI | AIBN | 40/40 | 1% $O_2$ | 1-butanol 50% | 27(gas)/6(liq.) | 1.8 mM |
| 4 | MMA | CPI | AIBN | 40/40 | 1% $O_2$ | 1-butanol 50% | 30(gas)/3(liq.) | 4 mM |

TABLE 5B

| entry | T (° C.) | t (min) | conv (%) | Mn | Mn, theo | PDI |
|---|---|---|---|---|---|---|
| C-1 | 80 | 30 | 48.3 | 5700 | 4800 | 1.52 |
|  |  | 60 | 71.6 | 6200 | 7200 | 1.53 |
|  |  | 120 | 80.3 | 6400 | 8000 | 1.52 |
| 1 | 80 | 30 | 41.7 | 4000 | 4200 | 1.29 |
|  |  | 60 | 64.3 | 5300 | 6400 | 1.30 |
|  |  | 120 | 77.7 | 5600 | 7800 | 1.37 |
| 2 | 80 | 30 | 36.3 | 3500 | 3600 | 1.22 |
|  |  | 70 | 60.3 | 5100 | 6000 | 1.24 |
|  |  | 120 | 72.3 | 5600 | 7200 | 1.28 |
| C-3 | 80 | 120 | 0 | — | — | — |
| C-4 | 80 | 30 | 52.8 | 7300 | 5300 | 1.61 |
|  |  | 60 | 76.1 | 7400 | 7600 | 1.68 |
|  |  | 120 | 81.8 | 7000 | 8200 | 1.73 |
| 3 | 80 | 30 | 38.3 | 4000 | 3800 | 1.33 |
|  |  | 60 | 59.4 | 5000 | 5900 | 1.35 |
|  |  | 120 | 61.3 | 5100 | 6100 | 1.45 |
| 4 | 80 | 30 | 33.1 | 3400 | 3300 | 1.26 |
|  |  | 70 | 56.5 | 4600 | 5700 | 1.29 |
|  |  | 120 | 75.4 | 4900 | 7500 | 1.34 |

Monomer: methyl methacrylate (MMA)
Solution polymerization (monomer concentration was 4 M (4000 mM))
Solvent: dipropylene glycol monomethyl ether (MFDG) or butanol
Monomer concentration: 8 M (bulk)
Alkyl halide to be used as a dormant species (R-I): 2-cyanopropyl iodide (CP-I)
Catalyst was not used.
radical initiator (In): azobisisobutyronitrile (AIBN)
$M_n$ and PDI: Molecular weight and polydispersity obtained by gel permeation chromatography (GPC) with tetrahydrofuran (THF) as an eluent calibrated by poly(methyl methacrylate) (PMMA) standard.

Example 6

The polymerization of methyl methacrylate (MMA) was carried out in the same manner as Example 1, except that the reaction materials and the reaction conditions were changed as shown in the following tables. The experimental results are shown in the following tables.
The polymerization was controlled regardless of the type of the initiator and the polymerization temperature. The polymerization was controlled when azo-compounds (AIBN, V70, and V65) or peroxides (BPO and PDX) were used.

TABLE 6A

| entry | monomer | R—X | I | [R—X]$_0$/[I]$_0$ (mM) | type of gas | volume of gaseous phase and liquid phase (mL/mL) | initial moles of O$_2$ in gaseous phase/volume of liquid phase (mM) |
|---|---|---|---|---|---|---|---|
| 1 | MMA | CPI | AIBN | 80/20 | 1% O$_2$ | 30(gas)/3(liq.) | 4 mM |
| 2 | MMA | CPI | V70 | 80/20 | 1% O$_2$ | 30(gas)/3(liq.) | 4 mM |
| 3 | MMA | CPI | V65 | 80/20 | 1% O$_2$ | 30(gas)/3(liq.) | 4 mM |
| 4 | MMA | CPI | BPO | 20/20 | 1% O$_2$ | 30(gas)/3(liq.) | 4 mM |
| 5 | MMA | CPI | PDX | 80/20 | 1% O$_2$ | 30(gas)/3(liq.) | 4 mM |

TABLE 6B

| entry | T (° C.) | t (min) | conv (%) | Mn | Mn, theo | PDI |
|---|---|---|---|---|---|---|
| 1 | 80 | 60 | 50.5 | 3800 | 5000 | 1.23 |
|  |  | 94 | 87.3 | 6500 | 8700 | 1.3 |
| 2 | 50 | 60 | 28.9 | 2900 | 2900 | 1.21 |
|  |  | 120 | 79.1 | 5900 | 7900 | 1.21 |
| 3 | 60 | 120 | 74.6 | 6300 | 7500 | 1.32 |
|  |  | 150 | 89.3 | 8100 | 8900 | 1.31 |
| 4 | 80 | 70 | 40.6 | 8800 | 16300 | 1.27 |
|  |  | 110 | 81.4 | 18500 | 32500 | 1.45 |
| 5 | 60 | 120 | 86.8 | 6800 | 8700 | 1.34 |

Monomer: methyl methacrylate (MMA)
Monomer concentration: 8M (bulk)
Alkyl halide to be used as a dormant species (R-I): 2-cyanopropyl iodide (CP-I)
Catalyst was not used.
Radical initiators (In): azobisisobutyronitrile (AIBN), 2,2'-azobis(4-methoxy-2,4-dimethylvaleronitrile) (V70), 2,2'-azobis(2,4-dimethylvaleronitrile) (V65), benzoyl peroxide (BPO), di(4-t-butylcyclohexyl)peroxycarbonate (PDX)
$M_n$ and PDI: Molecular weight and polydispersity obtained by gel permeation chromatography (GPC) with tetrahydrofuran (THF) as an eluent calibrated by poly(methyl methacrylate) (PMMA) standard.

Example 7

The polymerization of methyl methacrylate (MMA) was carried out in the same manner as Example 1, except that the reaction materials and the reaction conditions were changed as shown in the following tables. The experimental results are shown in the following tables.
A method in which a low molecular weight dormant species (alkyl iodide) was produced in the reaction solution during polymerization was also applicable. There was no dependency on the type of the radical initiator and the polymerization temperature.

TABLE 7A

| entry | monomer | R—X | I | [R—X]$_0$/[I]$_0$ (mM) | type of gas | volume of gaseous phase and liquid phase (mL/mL) | initial moles of O$_2$ in gaseous phase/volume of liquid phase (mM) |
|---|---|---|---|---|---|---|---|
| 1 | MMA | I$_2$ | V70 | 40/80 | 1% O$_2$ | 30(gas)/3(liq.) | 4 mM |
| 2 | MMA | I$_2$ | V70 | 40/100 | 1% O$_2$ | 30(gas)/3(liq.) | 4 mM |
| 3 | MMA | I$_2$ | AIBN | 40/75 | 1% O$_2$ | 30(gas)/3(liq.) | 4 mM |
| 4 | MMA | I$_2$ | AIBN | 40/75 | 1% O$_2$ | 32(gas)/1(liq.) | 12.8 mM |
| 5 | MMA | I$_2$ | V65 | 40/90 | 1% O$_2$ | 32(gas)/1(liq.) | 12.8 mM |

TABLE 7B

| entry | T (° C.) | t (min) | conv (%) | Mn | Mn, theo | PDI |
|---|---|---|---|---|---|---|
| 1 | 50 | 80 | 28.7 | 3500 | 2900 | 1.42 |
|   |    | 110 | 72.2 | 5300 | 7200 | 1.43 |
|   |    | 140 | 91.2 | 7100 | 9100 | 1.49 |
| 2 | 50 | 105 | 28.6 | 4400 | 4800 | 1.41 |
|   |    | 130 | 86.5 | 7000 | 8600 | 1.4 |
| 3 | 80 | 175 | 37.8 | 5800 | 3800 | 1.42 |
|   |    | 205 | 90.6 | 9500 | 9100 | 1.39 |
| 4 | 80 | 175 | 84.8 | 17000 | 8500 | 1.39 |
| 5 | 60 | 225 | 22.9 | 4200 | 2300 | 1.45 |
|   |    | 270 | 80.1 | 9100 | 8000 | 1.42 |

Monomer: methyl methacrylate (MMA)
Monomer concentration: 8M (bulk)

Alkyl halide to be used as a dormant species (R-I): prepared in the reaction solution by the reaction of I$_2$ and a radical initiator.

Catalyst was not used.

Radical initiators (In): azobisisobutyronitrile (AIBN), 2,2'-azobis(4-methoxy-2,4-dimethylvaleronitrile) (V70), 2,2'-azobis(2,4-dimethylvaleronitrile) (V65)

M$_n$ and PDI: Molecular weight and polydispersity obtained by gel permeation chromatography (GPC) with tetrahydrofuran (THF) as an eluent calibrated by poly(methyl methacrylate) (PMMA) standard.

Example 8 and Comparative Example 5

Polymerization of Styrene

The polymerization of styrene (St) was carried out using a method similar to that of Example 1, other than that the reaction materials and the reaction conditions were changed as shown in the following tables. The experimental results are shown in the following tables.

Entries 1 to 5 are the experiments of Example 8, and entries C-1 and C-5 are the experiments of Comparative Example 5.

The polymerization was controlled at the oxygen concentration of 1.8 mM to 26 mM.

In entry 5, the polymerization was also controlled when AIBN was used as the initiator instead of BPO.

TABLE 8A

| entry | monomer | R—X | I | [R—X]$_0$/[I]$_0$ (mM) | type of gas | volume of gaseous phase and liquid phase (mL/mL) | initial moles of O$_2$ in gaseous phase/volume of liquid phase (mM) |
|---|---|---|---|---|---|---|---|
| C-1 | St | CPI | BPO | 80/80 | 0% O$_2$ (100% Ar) | 30(gas)/3(liq.) | 0 mM |
| 1 | St | CPI | BPO | 80/80 | 1% O$_2$ | 27(gas)/6(liq.) | 1.8 mM |
| 2 | St | CPI | BPO | 80/80 | 1% O$_2$ | 30(gas)/3(liq.) | 4 mM |
| 3 | St | CPI | BPO | 80/80 | 1% O$_2$ | 32(gas)/1(liq.) | 12.8 mM |
| 4 | St | CPI | BPO | 80/80 | 1% O$_2$ | 32.5(gas)/0.5(liq.) | 26 mM |
| C-5 | St | CPI | BPO | 80/80 | 21% O$_2$ (atmosphere) | 30(gas)/3(liq.) | 84 mM |
| 5 | St | CPI | AIBN | 80/80 | 1% O$_2$ | 30(gas)/3(liq.) | 4 mM |

TABLE 8B

| entry | T (° C.) | t (min) | conv (%) | Mn | Mn, theo | PDI |
|---|---|---|---|---|---|---|
| C-1 | 80 | 240 | 88.7 | 6700 | 9200 | 1.60 |
| 1 | 80 | 240 | 91.6 | 6500 | 9500 | 1.40 |
| 2 | 80 | 240 | 92.9 | 6500 | 9700 | 1.39 |
| 3 | 80 | 240 | 91.7 | 6000 | 9600 | 1.39 |
| 4 | 80 | 240 | 95.5 | 5700 | 9900 | 1.39 |
| C-5 | 80 | 240 | 88.2 | 6600 | 9200 | 1.52 |
| 5 | 80 | 180 | 63.2 | 4200 | 6500 | 1.44 |

Monomer: styrene (St)
All were bulk polymerization (the monomer concentration was 8M (8000 mM))

Radical initiator: benzoyl peroxide (BPO) or azobisisobutyronitrile (AIBN)
Alkyl halide to be used as a dormant species (R-I): 2-cyanopropyl iodide (CP-I)
$M_n$ and PDI: Molecular weight and polydispersity obtained by gel permeation chromatography (GPC) with tetrahydrofuran (THF) as an eluent calibrated by polystyrene (PSt) standard.

Example 9

Polymerization of Benzyl Methacrylate (BzMA)

The polymerization was carried out in the same manner as Example 1, except that the reaction materials and the reaction conditions were changed as shown in the following tables. The experimental results are shown in the following tables.

TABLE 9A

| entry | monomer | R—X | I | [R—X]$_0$/[I]$_0$ (mM) | type of gas | volume of gaseous phase and liquid phase (mL/mL) | initial moles of O$_2$ in gaseous phase/volume of liquid phase (mM) |
|---|---|---|---|---|---|---|---|
| 1 | BzMA | CPI | AIBN | 80/10 | 1% O$_2$ | 30(gas)/3(liq.) | 4 mM |

TABLE 9B

| entry | T (° C.) | t (min.) | conv (%) | Mn | Mn, theo | PDI |
|---|---|---|---|---|---|---|
| 1 | 80 | 60 | 29 | 4300 | 5100 | 1.15 |
|   |    | 120 | 66 | 8800 | 11600 | 1.25 |

Monomer: benzyl methacrylate (BzMA)
Radical initiator: azobisisobutyronitrile (AIBN)
Bulk polymerization (monomer concentration was 8 M (8000 mM))

Alkyl halide to be used as a dormant species (R-I): 2-cyanopropyl iodide (CP-I)
$M_n$ and PDI: Molecular weight and polydispersity determined by multi-angle laser light scattering (MALLS) detector with gel permeation chromatography (GPC) with tetrahydrofuran (THF) as an eluent.

Example 10

Polymerization of GMA

The polymerization was carried out in the same manner as Example 1, except that the reaction materials and the reaction conditions were changed as shown in the following tables. The experimental results are shown in the following tables.

TABLE 10A

| entry | monomer | R—X | I | solvent | [R—X]$_0$/[I]$_0$/[I$_2$]$_0$ (mM) | type of gas | volume of gaseous phase and liquid phase (mL/mL) | initial moles of O$_2$ in gaseous phase/volume of liquid phase (mM) |
|---|---|---|---|---|---|---|---|---|
| 1 | GMA | CPI | AIBN | none (bulk polymerization) | 80/10/2 | 1% O$_2$ | 30(gas)/3(liq.) | 4 mM |
| 2 | GMA | CPI | AIBN | toluene 25 wt % | 60/7.5/1.5 | 1% O$_2$ | 30(gas)/3(liq.) | 4 mM |
| 3 | GMA | CPI | AIBN | toluene 50 wt % | 40/5/1 | 1% O$_2$ | 30(gas)/3(liq.) | 4 mM |
| 4 | GMA | CPI | AIBN | anisole 50 wt % | 40/20/1 | 1% O$_2$ | 30(gas)/3(liq.) | 4 mM |

TABLE 10B

| entry | T (° C.) | t (min.) | conv (%) | Mn | Mn, theo | PDI |
|---|---|---|---|---|---|---|
| 1 | 80 | 30 | 2.4 | 4800 | 400 | 1.19 |
|   |   | 60 | 80.9 | 10300 | 11400 | 1.48 |
| 2 | 80 | 30 | 32.5 | 1600 | 1300 | 1.13 |
|   |   | 60 | 51 | 3900 | 4600 | 1.35 |
|   |   | 120 | 73.8 | 5700 | 7200 | 1.89 |
| 3 | 80 | 60 | 20.1 | 3500 | 2800 | 1.22 |
|   |   | 120 | 27.9 | 4100 | 4000 | 1.23 |
|   |   | 240 | 37.1 | 4900 | 5200 | 1.23 |
| 4 | 80 | 60 | 52.7 | 5800 | 7500 | 1.23 |
|   |   | 120 | 87.9 | 8600 | 12400 | 1.42 |
|   |   | 160 | 101 | 8100 | 14300 | 1.42 |

Monomer: glycidyl methacrylate (GMA)
A radical initiator: azobisisobutyronitrile (AIBN)
Entry 1 was a bulk polymerization (monomer concentration was 8M (8000 mM)).
Entry 2 was a solution polymerization (monomer concentration was 6M (6000 mM)).
Entries 3 to 4 were solution polymerizations (monomer concentration was 4M (4000 mM)).
Alkyl halide to be used as a dormant species (R-I): 2-cyanopropyl iodide (CP-I)
$M_n$ and PDI: Molecular weight and polydispersity determined by multi-angle laser light scattering (MALLS) detector with gel permeation chromatography (GPC) with tetrahydrofuran (THF) as an eluent.

Example 11

Polymerization of PEGMA

The polymerization was carried out in the same manner as Example 1, except that the reaction materials and the reaction conditions were changed as shown in the following tables. The results are shown in the following tables.

TABLE 11A

| entry | monomer | R—X | I | $[R-X]_0/[I]_0$ (mM) | type of gas | volume of gaseous phase and liquid phase (mL/mL) | initial moles of $O_2$ in gaseous phase/ volume of liquid phase (mM) |
|---|---|---|---|---|---|---|---|
| 1 | PEGMA (n = 9) | CPI | BPO | 80/80 | 1% $O_2$ | 30 (gas)/ 3 (liq.) | 4 mM |
| 2 | PEGMA (n = 9) | CPI | BPO | 80/160 | 1% $O_2$ | 30 (gas)/ 3 (liq.) | 4 mM |

TABLE 11B

| entry | T (° C.) | t (min) | conv (%) | Mn | Mn, theo | PDI |
|---|---|---|---|---|---|---|
| 1 | 80 | 120 | 23.1 | 13000 | 11000 | 1.37 |
| 2 | 80 | 60 | 23.9 | 13700 | 11400 | 1.3 |

Monomer: polyethylene glycol methacrylate (PEGMA)
A radical initiator: BPO (bulk polymerization, monomer concentration was 8 M (8000 mM))

Alkyl halide to be used as a dormant species (R-I): 2-cyanopropyl iodide (CP-I)

$M_n$ and PDI: Molecular weight and polydispersity determined by multi-angle laser light scattering (MALLS) detector with gel permeation chromatography (GPC) with dimethylformamide (DMF) as an eluent.

Example 12

Polymerization of HEMA

The polymerization was carried out in the same manner as Example 1, except that the reaction materials and the reaction conditions were changed as shown in the following tables. The results are shown in the following tables.

TABLE 12A

| entry | monomer | R—X | I | [R—X]$_0$/ [I]$_0$ (mM) | type of gas | volume of gaseous phase and liquid phase (mL/mL) | initial moles of O$_2$ in gaseous phase/ volume of liquid phase (mM) |
|---|---|---|---|---|---|---|---|
| 1 | HEMA | CPI | V70 | 80/20 | 1% O$_2$ | 30 (gas)/ 3 (liq.) | 4 mM |

TABLE 12B

| entry | T (° C.) | t (min) | conv (%) | Mn | Mn, theo | PDI |
|---|---|---|---|---|---|---|
| 1 | 50 | 30 | 100 | 13000 | 13000 | 1.30 |

Monomer: 2-hydroxyethyl methacrylate (HEMA)
A radical initiator: 2,2'-azobis(4-methoxy-2,4-dimethylvaleronitrile) (V70)
Bulk polymerization (monomer concentration was 8 M (8000 mM))
Alkyl halide to be used as a dormant species (R-I): 2-cyanopropyl iodide (CP-I)
$M_n$ and PDI: Molecular weight and polydispersity determined by multi-angle laser light scattering (MALLS) detector with gel permeation chromatography (GPC) with dimethylformamide (DMF) as an eluent.

Example 13 and Comparative Example 6

HEMA-MMA Random Copolymerization

The polymerization was carried out in the same manner as Example 1, except that the reaction materials and the reaction conditions were changed as shown in the following tables. The experimental results are shown in the following tables.

Entries 1 to 7 are the experiments of Example 13, and entries C-1 and C-2 are the experiments of Comparative Example 6.

The polymerizations were controlled at the oxygen concentrations of 1.8 mM to 26 mM.

In entries 6 and 7, the polymerizations were also controlled when a solvent was added, the radical initiator was changed from V70 to AIBN, and the temperature of 50° C. to 80° C. was used.

TABLE 13A

| entry | monomer | R—X | I | solvent | $[R-X]_0/[I]_0$ (mM) | type of gas | volume of gaseous phase and liquid phase (mL/mL) | initial moles of $O_2$ in gaseous phase/volume of liquid phase (mM) |
|---|---|---|---|---|---|---|---|---|
| C-1 | HEMA/MMA (4000/4000) | CPI | V70 | none (bulk polymerization) | 80/80 | 1% $O_2$ | 21 (gas)/12 (liq.) | 0.7 mM |
| 1 | HEMA/MMA (4000/4000) | CPI | V70 | none (bulk polymerization) | 80/80 | 1% $O_2$ | 27 (gas)/6 (liq.) | 1.8 mM |
| 2 | HEMA/MMA (4000/4000) | CPI | V70 | none (bulk polymerization) | 80/80 | 1% $O_2$ | 30 (gas)/3 (liq.) | 4 mM |
| 3 | HEMA/MMA (4000/4000) | CPI | V70 | none (bulk polymerization) | 80/80 | 1% $O_2$ | 32 (gas)/1 (liq.) | 12.8 mM |
| 4 | HEMA/MMA (4000/4000) | CPI | V70 | none (bulk polymerization) | 80/80 | 1% $O_2$ | 32.5 (gas)/0.5 (liq.) | 26 mM |
| C-2 | HEMA/MMA (4000/4000) | CPI | V70 | none (bulk polymerization) | 80/20 | 21% $O_2$ (atmosphere) | 30 (gas)/3 (liq.) | 84 mM |
| 6 | MMA/HEMA (2000/2000) | CPI | V70 | MFDG 50 wt % | 40/40 | 1% $O_2$ | 30 (gas)/3 (liq.) | 4 mM |
| 7 | MMA/HEMA (2000/2000) | CPI | AIBN | MFDG 50 wt % | 40/20 | 1% $O_2$ | 30 (gas)/3 (liq.) | 4 mM |

TABLE 13B

| entry | T (° C.) | t (min) | conv (%) | Mn | Mn, theo | PDI |
|---|---|---|---|---|---|---|
| C-1 | 50 | 30 | 100 | 14000 | 11500 | 1.57 |
| 1 | 50 | 60 | 100 | 13000 | 11500 | 1.47 |
| 2 | 50 | 60 | 100 | 12000 | 11500 | 1.41 |
| 3 | 50 | 60 | 100 | 14000 | 11500 | 1.38 |
| 4 | 50 | 30 | 100 | 16000 | 11500 | 1.42 |
| C-2 | 50 | 30 | 0 | — | — | — |
|  |  | 120 | 0 | — | — | — |
| 6 | 50 | 60 | 34.9 | 4400 | 5700 | 1.18 |
|  |  | 90 | 64.2 | 6800 | 10500 | 1.19 |
|  |  | 210 | 85.3 | 8100 | 14000 | 1.21 |
| 7 | 80 | 90 | 11.2 | 2200 | 1800 | 1.18 |
|  |  | 300 | 45.7 | 10500 | 7500 | 1.17 |

Monomer: 2-hydroxyethyl methacrylate (HEMA), methyl methacrylate (MMA)
Solvent: dipropylene glycol monomethyl ether (MFDG)
Radical initiators: azobisisobutyronitrile (AIBN), 2,2'-azobis(4-methoxy-2,4-dimethylvaleronitrile) (V70)
Entries C-1, C-2, and 1-5: bulk polymerization (monomer concentration was 8 M (8000 mM))
Entries 6 and 7: solution polymerization (monomer concentration was 4M (4000 mM))
Alkyl halide to be used as a dormant species (R-I): 2-cyanopropyl iodide (CP-I)
$M_n$ and PDI: Molecular weight and polydispersity obtained by gel permeation chromatography (GPC) with dimethylformamide (DMF) as an eluent calibrated by poly(methyl methacrylate) (PMMA) standard.

Example 14

MAA-MMA Random Copolymerization

The polymerization was carried out in the same manner as Example 1, except that the reaction materials and the reaction conditions were changed as shown in the following tables. The results are shown in the following tables.

TABLE 14A

| entry | monomer | R—X | I | [R—X]$_0$/[I]$_0$ (mM) | type of gas | volume of gaseous phase and liquid phase (mL/mL) | initial moles of O$_2$ in gaseous phase/volume of liquid phase (mM) |
|---|---|---|---|---|---|---|---|
| 1 | MAA/MMA (3520/4480) | I$_2$ | V70 | 40/160 | 1% O$_2$ | 30 (gas)/3 (liq.) | 4 mM |

TABLE 14B

| entry | T (° C.) | t (min) | conv (%) | Mn | Mn, theo | PDI |
|---|---|---|---|---|---|---|
| 1 | 50 | 75 | 34.2 | 3200 | 4100 | 1.2 |
|   |    | 180 | 79.4 | 5600 | 9400 | 1.38 |

Monomer: methacrylic acid (MAA), methyl methacrylate (MMA)
Monomer concentration: 8 M (bulk polymerization)
Alkyl halide to be used as a dormant species (R-I) was produced within the vessel by the reaction of I$_2$ and V70.
A radical initiator: 2,2'-azobis(4-methoxy-2,4-dimethylvaleronitrile)(V70)
M$_n$ and PDI: Molecular weight and polydispersity obtained by gel permeation chromatography (GPC) with dimethylformamide (DMF) as an eluent calibrated by poly(methyl methacrylate) (PMMA) standard.

Monomer: 2-isocyanoethyl methacrylate (ICEMA), methyl methacrylate (MMA)

A radical initiator: 2,2'-azobis(4-methoxy-2,4-dimethylvaleronitrile) (V70)

Bulk polymerization (monomer concentration was 8 M (8000 mM))

Alkyl halide to be used as a dormant species (R-I): 2-cyanopropyl iodide (CP-I)

M$_n$ and PDI: Molecular weight and polydispersity obtained by gel permeation chromatography (GPC) with dimethylformamide (DMF) as an eluent calibrated by poly(methyl methacrylate) (PMMA) standard.

Example 15 and Comparative Example 7

Copolymerization of ICEMA-MMA

The polymerization was carried out in the same manner as Example 14, other than that the reaction materials and the reaction conditions were changed as shown in the following tables. The results are shown in the following tables.
Entry 1 is the experiment of Example 15, and entry C-1 is the experiment of Comparative Example 7.

Example 16

Polymerization of Acrylonitrile (AN)

The polymerization was carried out in the same manner as Example 1, except that the reaction materials and the reaction conditions were changed as shown in the following tables. The results are shown in the following tables.

TABLE 15A

| entry | monomer | R—X | I | [R—X]$_0$/[I]$_0$ (mM) | type of gas | volume of gaseous phase and liquid phase (mL/mL) | initial moles of O$_2$ in gaseous phase/volume of liquid phase (mM) |
|---|---|---|---|---|---|---|---|
| 1 | ICEMA/MMA (4000/4000) | CPI | V70 | 80/20 | 1% O$_2$ | 30 (gas)/3 (liq.) | 4 mM |
| C-1 | ICEMA/MMA (4000/4000) | CPI | V70 | 80/20 | 0% O$_2$ (100% Ar) | 30 (gas)/3 (liq.) | 0 mM |

TABLE 15B

| entry | T (° C.) | t (min) | conv (%) | Mn | Mn, theo | PDI |
|---|---|---|---|---|---|---|
| 1 | 50 | 60 | 13.4 | 3400 | 2100 | 1.21 |
|   |    | 120 | 42.2 | 6600 | 6500 | 1.4 |
| C-1 | 50 | 30 | 13.5 | 10000 | 2100 | 1.89 |

TABLE 16A

| entry | monomer | R—X | I | solvent | [R—X]$_0$/[I]$_0$ (mM) | type of gas | volume of gaseous phase and liquid phase (mL/mL) | initial moles of O$_2$ in gaseous phase/volume of liquid phase (mM) |
|---|---|---|---|---|---|---|---|---|
| 1 | AN | CPI | BPO | none (bulk polymerization) | 80/40 | 1% O$_2$ | 30 (gas)/ 3 (liq.) | 4 mM |
| 2 | AN | CPI | BPO | none (bulk polymerization) | 80/40 | 1% O$_2$ | 30 (gas)/ 3 (liq.) | 4 mM |
| 4 | AN | CPI | BPO | none (bulk polymerization) | 80/40 | 1% O$_2$ | 30 (gas)/ 3 (liq.) | 4 mM |
| 5 | AN | CPI | BPO | none (bulk polymerization) | 80/40 | 1% O$_2$ | 32 (gas)/ 1 (liq.) | 12.8 mM |
| 6 | AN | CPI | BPO | ethylene carbonate 50 wt % | 40/20 | 1% O$_2$ | 27 (gas)/ 6 (liq.) | 1.8 mM |
| 7 | AN | CPI | BPO | ethylene carbonate 50 wt % | 40/20 | 1% O$_2$ | 30 (gas)/ 3 (liq.) | 4 mM |
| 8 | AN | CPI | BPO | ethylene carbonate 50 wt % | 40/20 | 1% O$_2$ | 32 (gas)/ 1 (liq.) | 12.8 mM |
| 9 | AN | CPI | BPO | ethylene carbonate 50 wt % | 40/20 | 1% O$_2$ | 32.5 (gas)/ 0.5 (liq.) | 26 mM |
| 10 | AN | CPI | BPO | ethylene carbonate 50 wt % | 40/40 | 1% O$_2$ | 32.5 (gas)/ 0.5 (liq.) | 26 mM |

TABLE 16B

| entry | T (° C.) | t (min) | conv (%) | Mn | Mn, theo | PDI |
|---|---|---|---|---|---|---|
| 1 | 80 | 30 | 76.9 | 9800 | 4100 | 1.22 |
|   |    | 60 | 124.3 | 10900 | 6600 | 1.22 |
| 2 | 80 | 30 | 79 | 14500 | 8400 | 1.26 |
|   |    | 60 | 117.2 | 15600 | 12400 | 1.26 |
| 4 | 75 | 30 | 48.7 | 7500 | 2600 | 1.30 |
| 5 | 75 | 30 | 21.0 | 7700 | 1100 | 1.43 |
| 6 | 75 | 35 | 58.2 | 13000 | 3100 | 1.48 |
|   |    | 63 | 103.4 | 1500 | 5500 | 1.51 |
|   |    | 120 | 175.1 | 17000 | 9300 | 1.49 |
| 7 | 75 | 35 | 86.4 | 14000 | 4600 | 1.47 |
|   |    | 63 | 130.3 | 15000 | 6900 | 1.50 |
|   |    | 120 | 175.4 | 14000 | 9300 | 1.47 |
| 8 | 75 | 35 | 75.0 | 12000 | 4000 | 1.43 |
|   |    | 63 | 114.6 | 13000 | 6100 | 1.43 |
|   |    | 120 | — | — | — | — |
| 9 | 75 | 60 | 11.6 | 5100 | 620 | 1.21 |
|   |    | 120 | 29.1 | 5900 | 1500 | 1.26 |
| 10 | 75 | 60 | 179.3 | 16000 | 9500 | 1.50 |
|   |    | 120 | 2156 | 17000 | 11000 | 1.48 |

Monomer: acrylonitrile (AN)

Bulk polymerization (monomer concentration was 8 M (8000 mM))

A radical initiator: benzoyl peroxide(BPO)

Solution polymerization (monomer concentration was 4M (4000 mM))

Solvent: ethylene carbonate

Alkyl halide to be used as a dormant species (R-I): 2-cyanopropyl iodide (CP-I)

$M_n$ and PDI: Molecular weight and polydispersity determined by multi-angle laser light scattering (MALLS) detector with gel permeation chromatography (GPC) with dimethylformamide (DMF) as an eluent.

Reference Example 1

In the polymerization method using gaseous phase containing oxygen, the mechanism can be thought in which (1) the oxygen directly acts as the catalyst, or in which (2) the oxygen and a compound within the system react in the system to provide some compound, which acts as a catalyst. In view of (2), the compound newly produced during polymerization was isolated, and it was found that the compound has iodine and oxygen as main components. The elemental analysis of the compound was performed. As a result, iodine was 73% by weight and oxygen was 27% by weight. For example, I$_2$O$_5$ (76 by weight iodine, and 24 by weight oxygen) or the like can be thought as such a compound. We verified whether or not this compound acts as a catalyst under argon atmosphere. As a result, it was found that at least I$_2$O$_5$ acts as a catalyst. Therefore, the mechanism (2) was suggested. It was suggested that the polymerization was controlled by (2) alone, or by the combination of (1) and (2).

TABLE 17A

| entry | monomer | R—X | I | catalyst | [R—X]$_0$/[I]$_0$/[catalyst]$_0$ (mM) | type of gas | volume of gaseous phase and liquid phase (mL/mL) | initial moles of O$_2$ in gaseous phase/volume of liquid phase (mM) |
|---|---|---|---|---|---|---|---|---|
| 1 | MMA | CPI | AIBN | I$_2$O$_5$ | 80/20/40/40 | 0% O$_2$ (100% Ar) | 30 (gas)/ 3 (liq.) | 0 mM |

TABLE 17B

| entry | T (° C.) | t (min) | conv (%) | M$_n$ | M$_n$, theo | PDI |
|---|---|---|---|---|---|---|
| 1 | 80 | 30 | 15.5 | 2200 | 1600 | 1.4 |
|   |    | 60 | 43   | 3800 | 4300 | 1.22 |

Monomer: methyl methacrylate (MMA)
Radical initiator: azobisisobutyronitrile (AIBN)
Bulk polymerization (monomer concentration was 8 M (8000 mM))
Alkyl halide to be used as a dormant species (R-I): 2-cyanopropyl iodide (CP-I)
M$_n$ and PDI: Molecular weight and polydispersity obtained by gel permeation chromatography (GPC) with tetrahydrofuran (THF) as an eluent calibrated by poly(methyl methacrylate) (PMMA) standard.

Comparative Example 8

The polymerization experiment was carried out in the same manner as Comparative Example 2, entry C-1, except that the following formulations were used.
Monomer: styrene, 8.0 M (1 g)
Alkyl halide to be used as a dormant species: 1-phenylethyl bromide, 80 mM (0.016 g) (This is abbreviated as "PEB" in the following table)
Catalyst: CuBr 5 mM (0.00071 g)
Ligand: 4,4'-di-(5-nonyl)-2,2'-bipyridine 10 mM (0.0035 g) (This is abbreviated as "dHbipy" in the following table)
A ligand is always required in order to dissolve CuBr (catalyst) in a monomer. In a case of dHbipy, two equivalents are required with respect to CuBr. The concentration of the catalyst in this experiment (CuBr complex concentration) was 5 mM. Please note that no peroxide was used in these experiments, since it is technical common knowledge of those skilled in the art that no peroxide is used in cases of copper complex catalysts. The reasons are as follows: (1) in the cases of copper complex catalysts, the radical reaction is initiated even if a peroxide is not used; and (2) if a peroxide is added to a copper complex catalyst, then an inactivation reaction of the growing species can occur significantly and as a result, the molecular weight distribution becomes broader. Specifically, for example, the aforementioned Non-Patent Document 1 describes that a reaction material which contains no peroxide is used.

These materials were dissolved in a monomer to obtain a reaction solution. The reaction solution was charged in the reaction vessel, the air in the vessel was replaced with argon, and the vessel was sealed. The reaction solution was heated to 80° C. with stirring. The results are as follows.

TABLE 18

Result of polymerization with a copper complex

| No. | XA | [PEB]$_0$/[CuBr/2 dHbipy]$_0$ (mM) | T (° C.) | t (h) | conv (%) | M$_n$ | PDI |
|---|---|---|---|---|---|---|---|
| 1 | CuBr | 80/5 | 80 | 2 | 1.8 | 1200 | 1.40 |
|   |      |      |    | 4 | 3.5 | 1300 | 1.40 |
|   |      |      |    | 8 | 6.0 | 1400 | 1.38 |

PEB: 1-phenylethyl bromide
dHbipy: a ligand for dissolving CuBr into a monomer (styrene)
As a result, the monomer conversion was much lower than those of styrene in Example 8. Further, the values of M$_n$ after the reaction were 1200 to 1400, which are significantly low, and polystyrene having a high molecular weight could not be obtained.

As can be seen from the comparison of the result of Comparative Example 8 and the results of Example 8, a living radical polymerization is highly controlled in the method of the present invention, although a transition metal complex catalyst of the prior art is not used.

The aforementioned Examples show that the present invention has superior properties in comparison with the method using catalysts in the prior art, which is disclosed in the prior art.

For example, according to the Example described in the aforementioned Non-Patent Document 1, the following reaction solution is subjected to a reaction:
styrene: 8.7 M (1 g);
1-phenylethyl bromide: 87 mM (0.016 g);
CuBr: 87 mM (0.013 g); and
4,4'-di-(5-nonyl)-2,2'-bipyridine: 174 mM (0.076 g).

This reaction solution was heated to 110° C. for 7 hours, and a polymer was obtained. 0.089 g of the complex compound was used with respect to 1 g of the monomer. That is, the catalyst was used in a large amount of 8.9 weight % based on the monomer.

In comparison with this example, the present invention can eliminate the necessity to add a catalyst, and can also reduce the reaction temperature by 10 to 40° C.

As described above, the present invention has been illustrated using the preferred embodiments of the present invention. However, the present invention should not be construed to be limited to these embodiments. It is understood that the scope of the present invention should be construed solely on the basis of the claims. It is understood that those skilled in the art can carry out an invention within the scope equivalent to the description of the specification, based on the description of the specific preferred embodiments, the description of the present invention and the common technical knowledge. It is understood that the patents, patent applications, and other documents cited in the present specification should be incorporated by reference in the present specification as if the contents thereof are specifically described herein.

INDUSTRIAL APPLICABILITY

The method of the present invention is a method for performing a living radical polymerization by controlling the oxygen concentration in the vessel without adding a catalyst. Conventionally, the oxygen concentration in the vessel has not been believed as important for a living radical polymerization. Therefore, it was not believed that the oxygen concentration should be controlled. The present invention is a new technique which enables a living radical polymerization only by controlling the oxygen concentration, which is a method of a new concept which was never conceived conventionally.

Conventionally, oxygen was widely known to those skilled in the art as a polymerization inhibitor for radical polymerization. Therefore, it has been considered as a common technical knowledge that oxygen is removed in radical polymerization. However, in the present invention, it was found that a living radical polymerization is possible by setting the oxygen concentration to an appropriate concentration. This method does not require addition of a catalyst. This method is novel, reduces costs, has a high safety to the human body and environment, is industrially extremely advantageous, and is epoch-making.

The key of the present invention was to combine two points of controlling the oxygen concentration appropriately, and using an alkyl halide as a dormant species for a living radical polymerization. That is, it was found that oxygen acts not as a polymerization inhibitor but as a controlling agent for a living radical polymerization within an appropriate concentration range in the presence of an alkyl halide, and the living radical polymerization of a new concept was created.

As described above, the inventors obtained an invention of a new type of living radical polymerization method (a precisely controlled radical polymerization), which substantially does not require addition of a catalyst. According to the present invention, since a catalyst is not needed to be used, the problems associated with the conventional catalysts (such as toxicity, solubility, extreme reaction conditions, coloration/odor or the like of the catalyst) are solved. Therefore, the method of the present invention is significantly more environmental-friendly and economically advantageous than the conventional living radical polymerization.

One half or more of the amount of polymer compounds produced in the world is produced by radical polymerizations. A living radical polymerization method can be applied to the production of a variety of high value added material. Specifically, it can be used for production of, for example, thermoplastic elastomer (material for automobiles, industrial articles, medical materials, footwear, sports articles, toys, materials for coating electrical wire, materials for buildings or construction, materials for modifying resins, and the like), materials for resistor, organic electroluminescence material, adhesives, polymer alloy, various filler additives, lubricant, surfactant, paint, ink, packaging material, pharmaceuticals (for example, materials for sustained release medicaments), personal care products (cosmetics, hairdressings, and the like), sealing agent, plasticizer, tackifier, and the like. The scale of the market is very large. The living radical polymerization of the present invention can be widely used as a satisfactory process for producing new electronic materials, optical materials, separation materials, or materials for a living body.

The biggest problem in the prior art concerning the practical utilization of living radical polymerization has been the high cost of the catalyst. That is, when a living radical polymerization is carried out, the catalyst enters a state in which the catalyst has been incorporated into the resulting polymer, and therefore, it takes time and effort to recover the catalyst from the polymer. This, as a result, increases the process costs enormously, and is not practical. For this reason, it is difficult to practically recover and recycle the catalyst, and under the current situation, the catalyst is substantially used once and thrown away.

The inventors of the present invention discovered that even if a compound which was used as a catalyst in the conventional living radical polymerization is not used, the living radical polymerization is controlled by controlling the concentration and amount of the oxygen in the reaction vessel, and thus realized living radical polymerization at far lower costs as compared with the conventional techniques. Specifically, when the cost of catalyst required in synthesizing 1 kg of a polymer is calculated based on the prices described in the catalogue of Sigma-Aldrich Company, for example, with copper complex catalyst that is most frequently used as a conventional type catalyst, the cost of catalyst sums approximately to several thousand yen. Further, even if a germanium catalyst is used, the cost sums to about one thousand yen. On the other hand, in the present invention, the cost of a catalyst is not required. In other words, according to the present invention, it is possible to reduce the cost significantly, as compared with the conventional method using a catalyst.

Upon considering that the prices of various general-purpose monomers are generally around 100 yen to several hundred yen per kilogram, the cost for catalyst that is about ten times the cost for monomer, was required in the conventional techniques. In this regard, the present invention requires no cost for catalyst, and thus the cost reducing effect is dramatic.

In addition, the problems such as toxicity, problem of solubility (a ligand is unnecessary), reaction condition of high temperature, coloration/odor (treatment after a polymerization reaction is unnecessary) of a transition metal-type catalyst are solved by not using a catalyst in the method of the present invention. Further, the control of the polymerization is possible without adding a catalyst. Although germanium catalysts (iodides) are somehow sensitive to moisture and light, such a disadvantage does not exist in the method of the present invention, and the operation of polymerization is further facilitated.

Further, according to the method of the present invention, it is not necessary to use a catalyst. Therefore, it is not necessary to be afraid of inferior quality of the catalyst, and it is not necessary to be afraid of miscalculation of a very small amount of a catalyst. Moreover, it is not required to remove the catalyst after the polymerization, and therefore, it is possible to simplify the process and a polymer of high purity can be easily obtained.

As such, the present invention exhibits high environmental safety which is not possessed by conventional processes, as well as excellent economic efficiency and superior convenience that exceed the conventional techniques by far, and is highly excellent in practicality.

Moreover, the method of the present invention does not require to consider functional-group-tolerance of a catalyst, and accordingly is expected to be utilized for various functional monomers that have a functional group, and have many practical applications.

The invention claimed is:

1. A living radical polymerization method, comprising:
performing polymerization by charging a reaction solution containing a radical-reactive monomer, a radical initiator, and an organic halide having a carbon-halogen bond into a reaction vessel;
wherein the amount of oxygen in the gaseous phase within the reaction vessel during the polymerization step is 1 to 70 millimoles relative to 1 L of the volume of the liquid phase in the reaction vessel.

2. The method according to claim 1, wherein the amount of oxygen in the gaseous phase within the reaction vessel during the polymerization step is 1.5 to 30 millimoles relative to 1 L of the volume of the liquid phase in the reaction vessel.

3. The method according to claim 1, wherein no compound other than gaseous oxygen is added as a catalyst for reversibly producing a radical from the dormant species or as a compound for generating a catalyst for reversibly producing a radical from the dormant species in the reaction solution during the polymerization.

4. The method according to claim 1, wherein the oxygen concentration in the gaseous phase in the vessel is 1% by volume to 10% by volume.

5. The method according to claim 1, wherein the gaseous phase in the vessel is the air.

6. The method according to claim 1, wherein two methyl groups are bound to a carbon atom to which a halogen is bound in the organic halide, or one methyl group and one hydrogen are bound to a carbon atom to which a halogen is bound in the organic halide.

7. The method according to claim 1, wherein the halogen in the organic halide is iodine.

8. The method according to claim 1, wherein the radical-reactive monomer is acrylic acid, acrylate, methacrylic acid, methacrylate, or styrene.

9. The method according to claim 1, wherein
no solvent is used in the reaction solution, or the amount of the solvent used is 120 parts by weight or less relative to 100 parts by weight of the monomer,
the concentration of the radical initiator is 5 to 150 mM, and
the concentration of the organic halide is 10 to 100 mM.

10. A method for producing a polymer, comprising:
performing polymerization by charging a reaction solution containing a radical-reactive monomer, a radical initiator, and an organic halide having a carbon-halogen bond into a reaction vessel;
wherein the amount of oxygen in the gaseous phase within the reaction vessel during the polymerization step is 1 to 70 millimoles relative to 1 L of the volume of the liquid phase in the reaction vessel.

* * * * *